(12) United States Patent
Jeong et al.

(10) Patent No.: US 10,621,323 B2
(45) Date of Patent: Apr. 14, 2020

(54) BIOMETRIC AUTHENTICATION APPARATUS AND METHOD

(71) Applicant: REAL IDENTITY CO., LTD., Seoul (KR)

(72) Inventors: Ki-Hun Jeong, Daejeon (KR); Sung Hoon Jung, Paju-si (KR); Ssum Gyu Lee, Seoul (KR); Jungwoo Park, Daejeon (KR); Chaewan Park, Seoul (KR)

(73) Assignee: REAL IDENTITY CO., LTD., Seoul (KR)

( * ) Notice: Subject to any disclaimer, the term of this patent is extended or adjusted under 35 U.S.C. 154(b) by 20 days.

(21) Appl. No.: 16/085,416

(22) PCT Filed: Apr. 4, 2018

(86) PCT No.: PCT/KR2018/003961
§ 371 (c)(1),
(2) Date: Sep. 14, 2018

(87) PCT Pub. No.: WO2018/190562
PCT Pub. Date: Oct. 18, 2018

(65) Prior Publication Data
US 2019/0370444 A1 Dec. 5, 2019

(30) Foreign Application Priority Data
Apr. 10, 2017 (KR) .................. 10-2017-0045997

(51) Int. Cl.
*G06K 9/00* (2006.01)
*G06F 21/32* (2013.01)
*G06F 21/45* (2013.01)

(52) U.S. Cl.
CPC .............. *G06F 21/32* (2013.01); *G06F 21/45* (2013.01); *G06K 9/0012* (2013.01)

(58) Field of Classification Search
CPC ... G06T 5/50; G06T 7/50; G06T 2207/10024; G06T 2207/10028; G06F 21/32; G06F 21/45; G06K 9/00107; G06K 9/0012
See application file for complete search history.

(56) References Cited

U.S. PATENT DOCUMENTS

| 5,719,950 A | * | 2/1998 | Osten | ................... A61B 5/1171 382/115 |
| 5,990,804 A | | 11/1999 | Koyama | .................. 340/825.34 |

(Continued)

FOREIGN PATENT DOCUMENTS

| JP | H 10-302047 A | 11/1998 |
| JP | 2000123143 A | 4/2000 |

(Continued)

OTHER PUBLICATIONS

Korea Office Action dated May 9, 2018, issued to Korean Application No. 10-2017-0045997.

(Continued)

*Primary Examiner* — Yon J Couso
(74) *Attorney, Agent, or Firm* — Stein IP, LLC

(57) ABSTRACT

The present invention relates to a biometric authentication apparatus and a biometric authentication method. In the present invention, provided is the authentication apparatus and authentication method of, while placing an object for biometric authentication on a space between a first electrode and a second electrode, applying a square wave with a single period to the first electrode and performing biometric authentication using a measurement voltage width, which is a difference between a maximum value (a maximum measurement voltage value) and a minimum value (a minimum measurement voltage value) of voltage measured at the first electrode, and an arriving time required for the voltage measured at the first electrode to reach a particular range of the maximum measurement voltage value from the mini- (Continued)

mum measurement voltage value. The biometric authentication apparatus and method according to the present invention possibly provide a human body detect function for personal authentication with high reliability.

15 Claims, 18 Drawing Sheets

(56) References Cited

U.S. PATENT DOCUMENTS

| | | | |
|---|---|---|---|
| 2004/0136573 A1* | 7/2004 | Sato | G06K 9/0002 382/115 |
| 2005/0163350 A1 | 7/2005 | Kim et al. | 382/124 |
| 2005/0259850 A1* | 11/2005 | Shimamura | G06K 9/0002 382/124 |
| 2006/0034493 A1 | 2/2006 | Shimamura et al. | 382/115 |

FOREIGN PATENT DOCUMENTS

| | | |
|---|---|---|
| JP | 2000-172833 A | 6/2000 |
| JP | 2000-194848 A | 7/2000 |
| JP | 2007-244712 A | 9/2007 |
| JP | 2009-223462 A | 10/2009 |
| KR | 10-2003-0073276 A | 9/2003 |
| KR | 10-2005-0051659 A | 6/2005 |
| WO | WO 2005/019767 A1 | 3/2005 |
| WO | WO 2016/130070 A1 | 8/2016 |

OTHER PUBLICATIONS

Korean Notice of Allowance dated Feb. 21, 2019, issued to Korean Application No. 10-2017-0045997.
"Impedance-Sensing Circuit Techniques for Integration of a Fraud Detection Function Into a Capacitive Fingerprint Sensor", Toshishige Shimamura et all, IEEE Sensors Journal. vol. 12. No. 5, May 2012.
Written Opinion dated Aug. 6, 2018, issued to International Application No. PCT/KR2018/003961.
International Search Report dated Aug. 6, 2018, issued to International Application No. PCT/KR2018/003961.
Korean Office Action dated May 9, 2018, issued to Korean Application No. 10-2017-0045997.
Extended European Search Report dated Aug. 7, 2019, issued to European Application No. 18780016.4.

* cited by examiner (a)

(b)

BIOMETRIC AUTHENTICATION APPARATUS AND METHOD

CROSS-REFERENCE TO RELATED APPLICATIONS

This application is a national stage of International Application No. PCT/KR2018/003961, filed Apr. 4, 2018, which claims the benefit of priority to Korean Application No. 10-2017-0045997, filed Apr. 10, 2017, in the Korean Intellectual Property Office, the disclosures of which are incorporated herein by reference.

TECHNICAL FIELD

The present invention relates to a biometric authentication apparatus and a biometric authentication method. More particularly, the present invention relates to a biometric authentication apparatus and a biometric authentication method that perform biometric authentication by applying a square wave with a single period and using a maximum measurement voltage value and an arriving time.

BACKGROUND ART

Small information devices, such as a mobile phone, a personal digital assistant (PDA), and the like, have been required to have security due to their high specification. As communication speed increases, the frequency of storing information in a remote server and accessing the server over a network gradually increases. In order to access the information that requires security, authentication is necessary in the small information devices. Examples of a range in which high-level security is required include the financial transactions field, such as mobile banking and a digital wallet.

Methods of ensuring security in the small information devices include personal authentication using a password, identification (ID) card, or the like. However, the password or the ID card is at a high risk of being stolen. Thus, in fields, such as financial transactions, and the like, more enhanced personal authentication (authentication of the user of the device to which the user is previously registered) is required. In order to respond to the demand, biometric information is increasingly used, and fingerprints among biometric information are mainly used for convenience.

However, in the case of fingerprints, there is a problem that authentication may fail due to counterfeit fingerprints formed of silicone or gummies. To solve the problem of fingerprints, there is a proposal to use various types of biometric information including the iris, blood flow, impedance, or the like. Some types of biometric information have been implemented technically, but for financial reasons, have not become commercially popularized yet.

In non-patent document 1 below, there is proposed technology of authenticating a human body by using a characteristic that an input power with multiple frequencies is applied to the human body and impedance magnitude and phase of the human body vary with frequency change. A brief summary of the known biometric authentication technology using impedance is that biometric authentication is possible by applying voltage to the human body with varying frequency and by measuring the impedance magnitude and phase of the human body according to the frequency change. As shown in the conventional technology, in order to authenticate the human body using impedance, it is necessary to have (1) a circuit for applying the with input power multiple frequencies and (2) a circuit for measuring the impedance magnitude and phase of the human body according to each frequency. Particularly, in order to measure the impedance magnitude and phase, a measurement signal is multiplied by sine sinusoidal waves and cosine sinusoidal waves, the result is passed through a low pass filter, and the real part and the imaginary part of impedance response are obtained and used in measuring the magnitude and phase. Construction of the circuit with reliability level results in complexity in hardware configuration, and thus there is a difficulty in popularization.

DOCUMENTS OF RELATED ART

Japanese Patent Application Publication No. 2000-123143 (published 28 Apr. 2000)
Japanese Patent Application Publication No. Hei. 10-302047 (published 13 Nov. 1998)
Japanese Patent Application Publication No. 2000-194848 (published 14 Jul. 2000)
Japanese Patent Application Publication No. 2000-172833 (published 23 Jun. 2000)
Korean Patent Application Publication No. 10-2005-0051659 (published 1 Jun. 2005)
"Impedance-Sensing Circuit Techniques for Integration of a Fraud Detection Function Into a Capacitive Fingerprint Sensor", Toshishige Shimamura et all, IEEE SENSORS Journal. Vol. 12. NO. 5, May 2012

DISCLOSURE

Technical Problem

The present invention has been proposed to solve the problems in the related art. The present invention is intended to propose a biometric authentication apparatus and a biometric authentication method of performing biometric authentication using impedance without a circuit for applying an input power with multiple frequencies. Also, provided are the biometric authentication apparatus and the biometric authentication method of performing biometric authentication using impedance without a circuit which is capable of measuring impedance magnitude and phase of a human body depending on each frequency of the input power.

Also, the present invention is intended to propose a biometric authentication apparatus and a biometric authentication method of applying a square wave input power with a single period to the human body, of calculating an arriving time and a measurement voltage width using voltage response of the human body, and of performing biometric authentication.

Technical Solution

In order to achieve the above object, the present invention provides a biometric authentication apparatus for authenticating a human body using impedance of a particular part of the human body, the apparatus including: a first electrode; a second electrode spaced apart from the first electrode by maintaining an electrical insulation state therebetween; a driving unit applying a square wave with a single period to the first electrode; a sensing unit detecting a maximum measurement voltage value and a minimum measurement voltage value that are a maximum value and a minimum value of voltage detected at the first electrode while the voltage measured at the first electrode is in a stabilized state, the sensing unit outputting an arriving time that is the time required for the detected voltage to reach a particular range of a measurement voltage width, which is a difference between the maximum measurement voltage value and the minimum measurement voltage value, from the minimum measurement voltage value; and a signal processing unit determining the human body using the measurement voltage width and the arriving time input from the sensing unit.

Here, the stabilized state may mean a state where the maximum measurement voltage value and the minimum measurement voltage value, which are detected at the first electrode by the square wave applied to the first electrode, remain constant during two or more successive periods.

Preferably, the biometric authentication apparatus may further include an additional register Re of which one end is connected to the driving unit and the other end is connected to the first electrode, and the second electrode may be connected to ground. Also, preferably, the single period of the square wave may be one period selected from periods ranging from 0.067 ms to 2.00 ms. More preferably, the single period may be one period selected from periods ranging from 0.067 ms to 1.42 ms.

Preferably, according to the present invention, the sensing unit of the biometric authentication apparatus may include: an AD conversion unit converting an analog voltage input from the first electrode into a digital voltage; a maximum and minimum voltage detection unit detecting the minimum value (the minimum measurement voltage value) and the maximum value (maximum measurement voltage value) of the voltage input from the AD conversion unit during a predetermined period; and an arriving time calculation unit calculating the arriving time Tr using the voltage varying with time input from the AD conversion unit and the minimum measurement voltage value and the maximum measurement voltage value input from the maximum and minimum voltage detection unit. Here, preferably, duration of the square wave applied through the additional register Re may be in a range where the voltage measured at the first electrode does not reach a saturation stage.

In order to achieve the other object, the present invention provides a biometric authentication method of determining whether an object placed on a first electrode and a second electrode is a human body, the method including: applying, at a first step, a square wave with a single period to the first electrode; and calculating, at a third step, an arriving time that is the time required for voltage measured at the first electrode to reach a particular range of a maximum value (a maximum measurement voltage value) of the voltage measured at the first electrode, from a minimum value (a minimum measurement voltage value) of the voltage measured at the first electrode.

Preferably, the biometric authentication method may further include obtaining, at a second step performed between the first step and the third step, the minimum value (the minimum measurement voltage value) of the voltage measured at the first electrode during one or more periods and the maximum measurement voltage value. Also, preferably, the biometric authentication method may further include authenticating, at a fourth step performed after the third step, whether the object is the human body by using a measurement voltage width and the arriving time.

When performing the biometric authentication method according to the present invention, preferably, at the first step, the square wave with the single period is applied to the first electrode through an additional resister Re, and the second electrode may be connected to ground. In the present invention, preferably, the single period used for biometric authentication may be one period selected from periods ranging from 0.067 ms to 2.00 ms, and more preferably, from periods ranging from 0.067 ms to 1.42 ms. Here, preferably, duration of the applied square wave may be in a range where the voltage measured at the first electrode does not reach a saturation stage.

Advantageous Effects

In a conventional biometric authentication apparatus using impedance as biometrics information, required is a circuit for applying an input power of multiple frequencies in sequence to an input electrode and for measuring impedance magnitude and phase applied to the human body depending on each frequency input. However, it is difficult to implement the circuit in a small portable device, such as a smart phone, in practice due to complicated implementation.

Compared with this, the biometric authentication apparatus according to the present invention is advantageous in that biometric authentication is possible by applying power with a single frequency to an input electrode within one second (preferably, within 0.1 second) while firmly placing a particular part of the human body between two electrodes and by measuring the measurement voltage width, which is a difference between the maximum measurement voltage value and the minimum measurement voltage value measured at a sensing electrode during a stabilization state, and the arriving time that it takes the measurement voltage to reach a predetermined range of the measurement voltage width from the minimum voltage value. That is, compared with the conventional technology, implementation of an input circuit and a measurement circuit is easy and simple, so that the apparatus is reduced in size and is easily mounted in small portable device, such as a smart phone.

DESCRIPTION OF REFERENCE NUMERALS OF DRAWINGS

Figure 1:
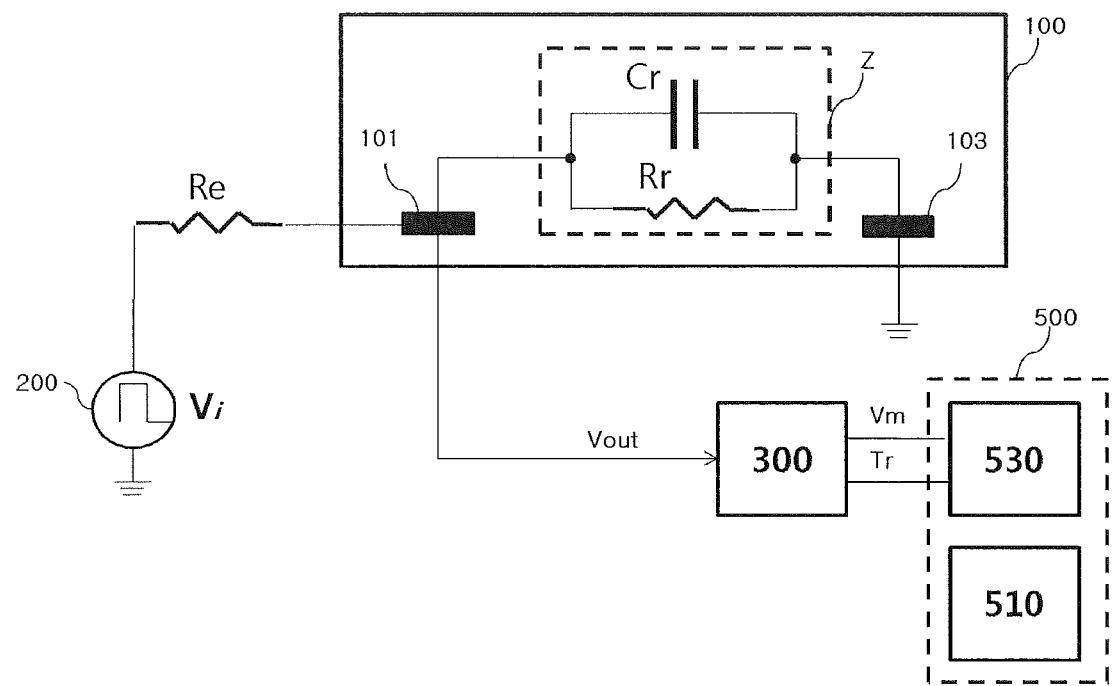
FIG. 1 is an equivalent circuit diagram illustrating a biometric authentication apparatus according to the present invention.

100: panel unit
101, 101a, 101b: first electrode
103: second electrode
105: fingerprint sensing electrode
200: driving unit
300: sensing unit
310: AD conversion unit
320: maximum and minimum voltage detection unit
330: arriving time calculation unit
510: control unit
530: signal processing unit
550: control and signal processing unit

MODE FOR INVENTION

The present invention may be modified in various ways and implemented by various embodiments, so that specific embodiments are shown in the drawings and will be described in detail.

It is to be understood that the present invention is not limited to the specific exemplary embodiments, but includes all modifications, equivalents, and substitutions included in the spirit and the scope of the present invention.

Description of the present invention is focused mainly on fingerprints among body parts, but it should be understood that the present invention also applies to other body parts other than fingerprints. Describing the present invention with respect to fingerprints is because it is easy to form a counterfeit fingerprint of the relevant part using various materials. For example, various materials, such as glue, gelatin, silicone, clay, and the like, may be used in forming a counterfeit fingerprint. Before describing experiments for the present invention, the inventor of the present invention conducted various experiments that with respect to counterfeit fingerprints of the above-enumerated various materials and the human body fingerprint, an input power of multiple frequencies in sequence is applied and then, impedance magnitude and phase are measured so as to find out whether it is possible to distinguish the human body from the counterfeit fingerprint. As the experiment results, in the case of the human body, a phenomenon was found that when the frequency increased in a range of 500 Hz (preferably, 700 Hz) to 15,000 Hz, impedance magnitude and phase measured in the human body linearly decreased. Also, compared with the counterfeit fingerprints formed of various materials, it was found that the counterfeit fingerprint made of clay showed the most similar characteristics to the human body. Therefore, in the present invention, described are the biometric authentication method and the biometric authentication apparatus capable of distinguishing the human body fingerprint from the counterfeit fingerprint formed of a day material in various dry states, which shows the most similar characteristics to the human body.

The information on impedance obtained by the biometric authentication apparatus according to the present invention may also be used in fingerprint recognition. In the case of sensing ridges and valleys of an authentication target person using the biometric authentication apparatus proposed in the present invention, the ridges touch directly the space between electrodes of the biometric authentication apparatus without any medium while the valleys interpose air between the skin and the sensor. Thus, cases differ in an arriving time and a measurement voltage width with respect to impedance. Ridges and valleys are obtained using the arriving time and the measurement voltage width with respect to impedance, are subjected to thinning. Next, a characteristic value, which includes a point for divergence or convergence, and the like, is obtained from information on thinning. The obtained characteristic value is compared with a pre-registered characteristic value, whereby fingerprint recognition is possible. Comparing the biometric authentication apparatus according to the present invention with the conventional fingerprint sensor, they differ up to the step of obtaining ridge and valley information, but the remaining data processing method may be the same as the method used in conventional fingerprint recognition.

The biometric authentication apparatus proposed in the present invention may also be used in biometrics using micro perspiration. At a time t0 and a time t1 (the larger the number of times for measurement is better), the arriving time and the measurement voltage width are measured with respect to impedance, and micro perspiration is sensed using the difference in the arriving time and the measurement voltage width with respect to impedance at the two times. Perspiration data including the position of the sensed micro perspiration is generated, and the perspiration data is used in authentication for determining whether it is the human body or in personal identification authentication of the authentication target person. Since micro perspiration has a different moisture element from that of skin, there is a difference in impedance between the skin portion on which micro perspiration appears and the skip portion on which micro perspiration does not appear. However, the amount is so tiny that a definite difference may be not shown. Nevertheless, by setting a frequency range in which the difference in impedance depending on a frequency between moisture of dry skin and of a micro perspiration element is apparent, and by obtaining impedance according to the set frequency, the position at which micro perspiration has appeared is found. Whether the position at which micro perspiration has appeared is on the ridge, whether the shape thereof is the shape of micro perspiration, and whether the distribution is similar to distribution of micro perspiration of a general human are checked, and thus whether it is a human body or not is further recognized. In personal identification authentication of an authentication target person, micro perspiration authentication of the present invention is applied with conventional fingerprint authentication together for high accuracy, rather than being applied alone. Also, by using positions of pores as additional characteristic value for personal authentication and by further checking whether positions at which micro perspiration appear are equal to the positions of the pores, user authentication is enhanced. As a result, the number of individual characteristic values used in biometric authentication increases, and thus a false recognition rate is reduced. Particularly, in recent years, as the size of the fingerprint recognition sensor used for cards, and the like is reduced, the number of personal authentication characteristic values is reduced, which may alleviate the problem that the false recognition rate increases. However, it is necessary that resolution of the fingerprint recognition sensor is good enough to check and store positions of pores when registering the fingerprint.

FIG. 1 is an equivalent circuit diagram illustrating a biometric authentication apparatus according to the present invention. The biometric authentication apparatus includes a driving unit 200, a panel unit 100, a sensing unit 300, a control unit 510, and a signal processing unit 530. The driving unit 200 is a circuit unit that applies a square wave voltage with a fixed period to the panel unit 100. The panel unit 100 is a panel that includes multiple electrodes 101 and 103 of which upper portions a human finger (other body parts to be measured are also possible) is placed for measuring information on impedance. The driving unit 200 applies an input voltage Vi in the form of a square wave with one frequency selected from 500 Hz to 15,000 Hz (when converted to a period, a period of 0.067 ms to 2 ms) within one second (preferably, within 0.1 second). When the frequency was larger than 15,000 Hz, the measured impedance magnitude and phase of the human body depending on the frequency did not change linearly, leading to confusion of the counterfeit object. When the frequency was less than 700 Hz, the measured impedance magnitude and phase of the human body depending on the frequency did not change linearly, leading to confusion of the counterfeit object. However, in some human bodies, a linearly changing characteristic is found even at least 500 Hz (the period of 2 ms), which is less than 700 Hz. Therefore, the lower limit of the frequency may be less than 700 Hz.

Also, here, the time within one second is such a short time that the human body part placed between the first electrode 101 and the second electrode 103 does not move while impedance is measured. Thus, when the time is shorter than one second, a more accurate result is obtained. Preferably, the time for measurement without fine movement of the human body was best within 0.1 second.

In FIG. 1, a finger is expressed in an equivalent circuit Z in which a capacitor Cr and a resistor Rr are connected in parallel. The multiple electrodes 101 and 103 are the first electrode 101 and the second electrode 103 spaced apart from each other by maintaining the electrical insulation state therebetween. The first electrode 101 receives the square wave voltage supplied from the driving unit 200 through an additional register Re. The second electrode 103 is connected to ground. The second electrode 103 may be connected to a ground line through a register of a small value if necessary. The additional register Re is not an element that provides a special function, and is an additional register which is used to prevent the case in which a large amount of current flows instantaneously into the capacitor Cr of the human body equivalent circuit, resulting in a short circuit when the driving unit 200 suddenly applies an impulse voltage to the first electrode 101.

Figure 2:
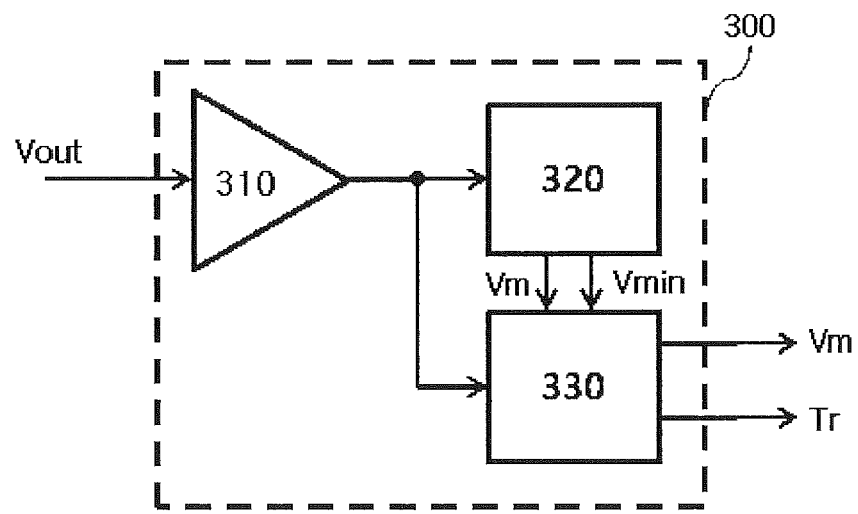
FIG. 2 is a circuit block diagram illustrating an example of a sensing unit according to the present invention.

The sensing unit 300 is a circuit unit electrically connected to the first electrode 101 to sense an output voltage applied to the first electrode 101 and to measure maximum and minimum measurement voltage values and the arriving time. The maximum measurement voltage value is defined as a maximum voltage value measured at the first electrode 101 by the square waves input during one or more periods. The minimum measurement voltage value is defined as the minimum voltage value measured at the first electrode 101 by the square waves input during one or more periods. The arriving time means a time that it takes the voltage measured at the first electrode 101 by the input square wave to reach a particular range (63% in the experiment) of the measurement voltage width (the difference between the maximum measurement voltage value and the minimum measurement voltage value) from the minimum measurement voltage value. Therefore, it should be understood that the arriving time used in the present invention has more comprehensive meaning than the time constant which is generally used in a circuit. FIG. 2 is a circuit block diagram illustrating an example of the sensing unit according to the present invention. The sensing unit 300 includes an AD conversion unit 310, a maximum and minimum voltage detection unit 320, and an arriving time calculation unit 330. The AD conversion unit 310 is a circuit unit that converts an analog voltage output from the first electrode 101 into a digital voltage for output. The maximum and minimum voltage detection unit 320 is a circuit unit that detects the minimum value (the minimum measurement voltage value) and the maximum value (the maximum measurement voltage value) of the digital voltage input from the AD conversion unit 310 during one or more periods. The arriving time calculation unit 330 is a circuit unit that outputs the arriving time Tr that is takes the voltage input from the AD conversion unit 310 to reach "0.63×(maximum measurement voltage value−minimum measurement voltage value)" from the minimum measurement voltage value by using the voltage varying with time input from the AD conversion unit 310 and the minimum measurement voltage value and the maximum measurement voltage value input from the maximum and minimum voltage detection unit 320. In FIG. 2, the maximum measurement voltage value Vm is described as being output from the arriving time calculation unit 330, but may also be configured to be output from the maximum and minimum voltage detection unit 320.

The control unit 510 is a circuit unit that generates and applies a control signal for controlling each circuit unit, according to appropriate timing. The signal processing unit 530 is a circuit unit that determines whether it is the human body using the measurement voltage width and the arriving time input from the sensing unit 300. The control unit 510 and the signal processing unit 530 may be configured in a single circuit element by being combined or in multiple circuit elements. The single circuit element into which the control unit 510 and the signal processing unit 530 are combined is referred to as "a control and signal processing unit 500" for convenience.

Figure 3:
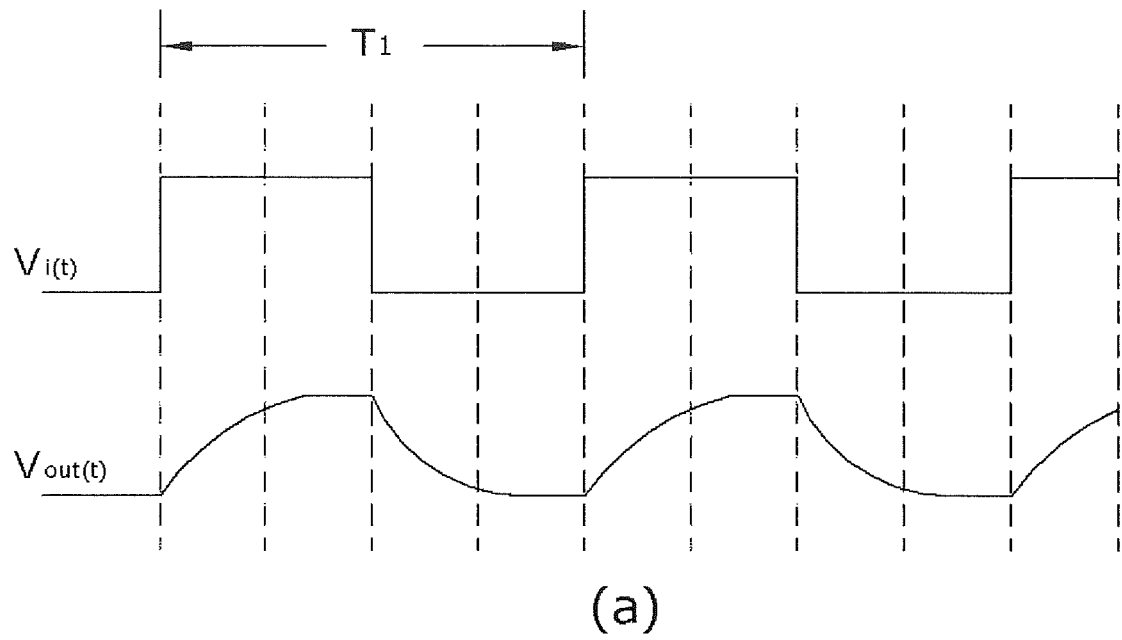
FIG. 3a and FIG. 3b are waveform diagrams illustrating output voltage waveforms that are measured at a first electrode when applying square waves with different periods T1 and T2 and a 50% duty ratio.
Figure 3:
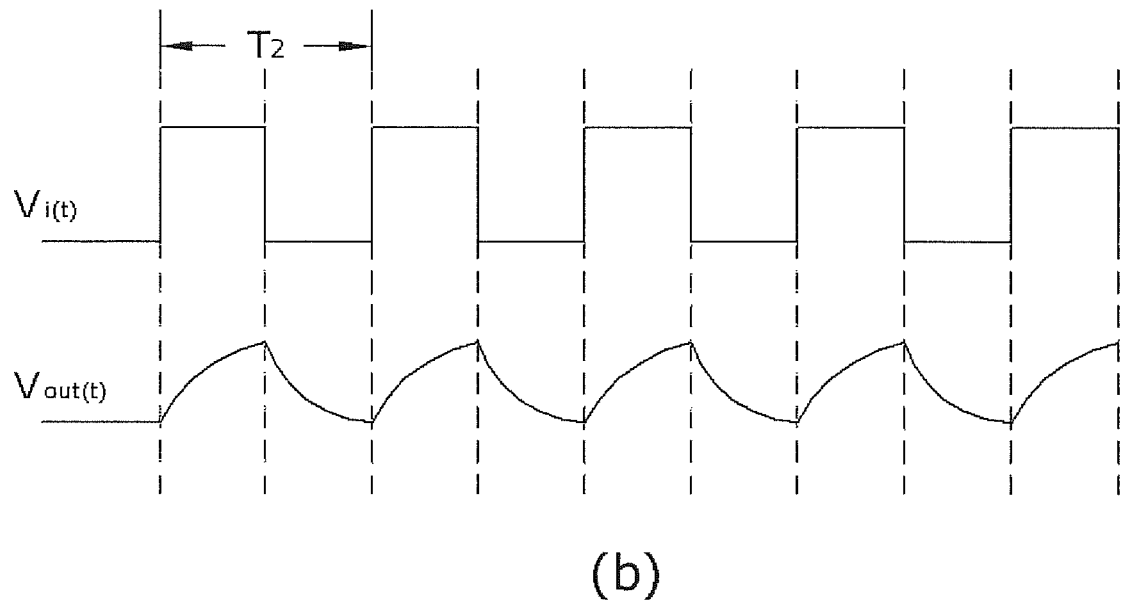
Figure 4:
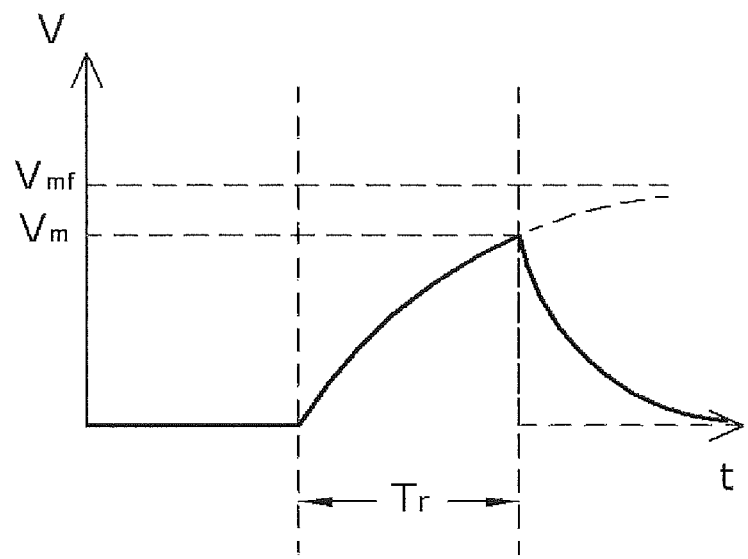
FIG. 4 is a waveform diagram illustrating one output waveform shown in FIG. 3b again.

FIG. 3a and FIG. 3b are waveform diagrams illustrating output voltage waveforms that are respectively measured at a first electrode when applying square waves with different periods T1 and T2 and a 50% duty ratio. The square wave shown in FIG. 3a is a wave with the period T1 and the duty ratio of 50%, and the voltage Vout measured at the first electrode is shown in the form of reaching the saturated state. The square wave shown in FIG. 3b is a wave with the period T2 (T1>T2) and the duty ratio of 50%, and the voltage Vout measured at the first electrode is shown in the form of not reaching the saturated state. This will be described in detail with reference to FIG. 4. FIG. 4 is a waveform diagram illustrating one output waveform shown in FIG. 3b again. As shown in FIG. 4, the maximum measurement voltage value Vm is defined as the maximum value of the output voltage measured at the first electrode in response to the input square wave. If the input square wave had a sufficient pulse width (duration), the voltage would increase to the maximum value Vfm being in saturation, but the voltage increased up to the maximum measurement voltage value Vm and decreased due to a short pulse width (duration). The present invention may be implemented by applying the square wave with such a pulse width that the voltage measured at the first electrode reaches the saturation state or does not reach the saturation state. That is, in the present invention, the measurement voltage width and the arriving time are measured by applying the square wave with a known period and duty ratio, and are used in biometric authentication.

Figure 5:
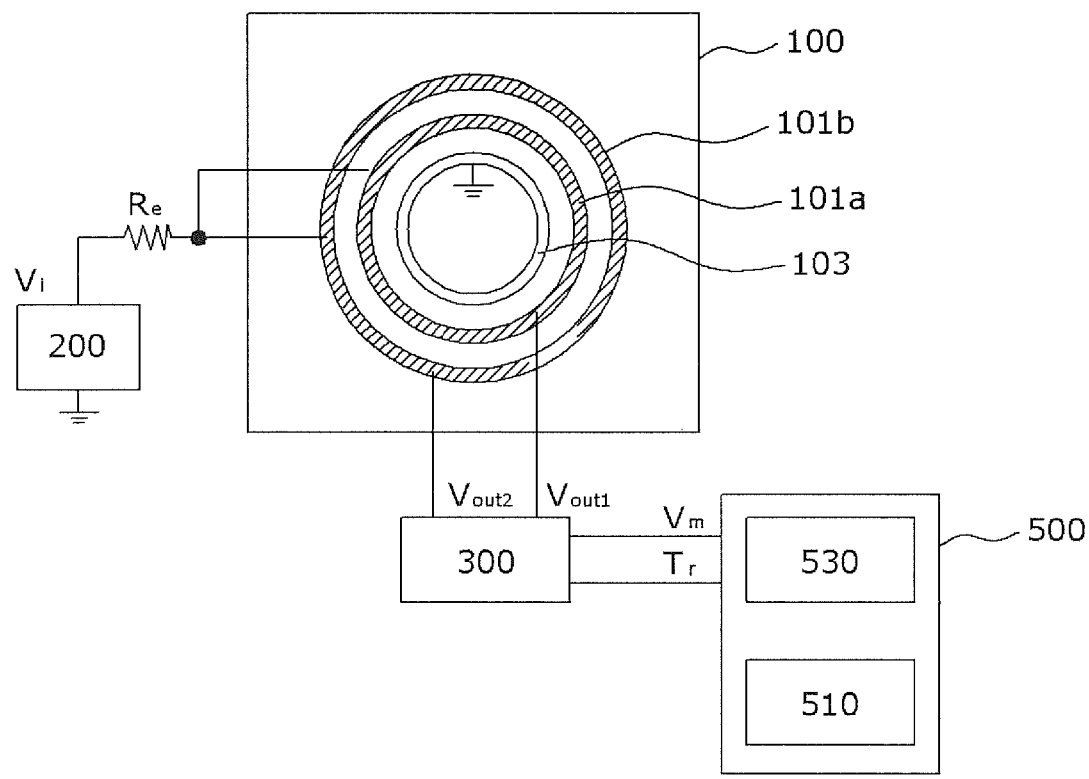
FIG. 5 is a configuration diagram illustrating a biometric authentication apparatus according to the present invention.

FIG. 5 is a configuration diagram illustrating a biometric authentication apparatus according to the present invention. FIG. 5 shows an example in which the panel unit 100 includes two first electrodes 101a and 101b and one second electrode 103, and shows that the panel unit 100 includes the first electrodes and the second electrode with a composition ratio of n:1 (here, n is a natural number greater than one). The square wave input voltage Vi is applied to each of the first electrodes 101a and 101b through the additional register Re, and the second electrode 103 is connected in the ground state. Hereinafter, the first electrode 101a and the first electrode 101b will be collectively referred to as the first electrode 101 for convenience of description when it is unnecessary to distinguish them separately.

Figure 6:
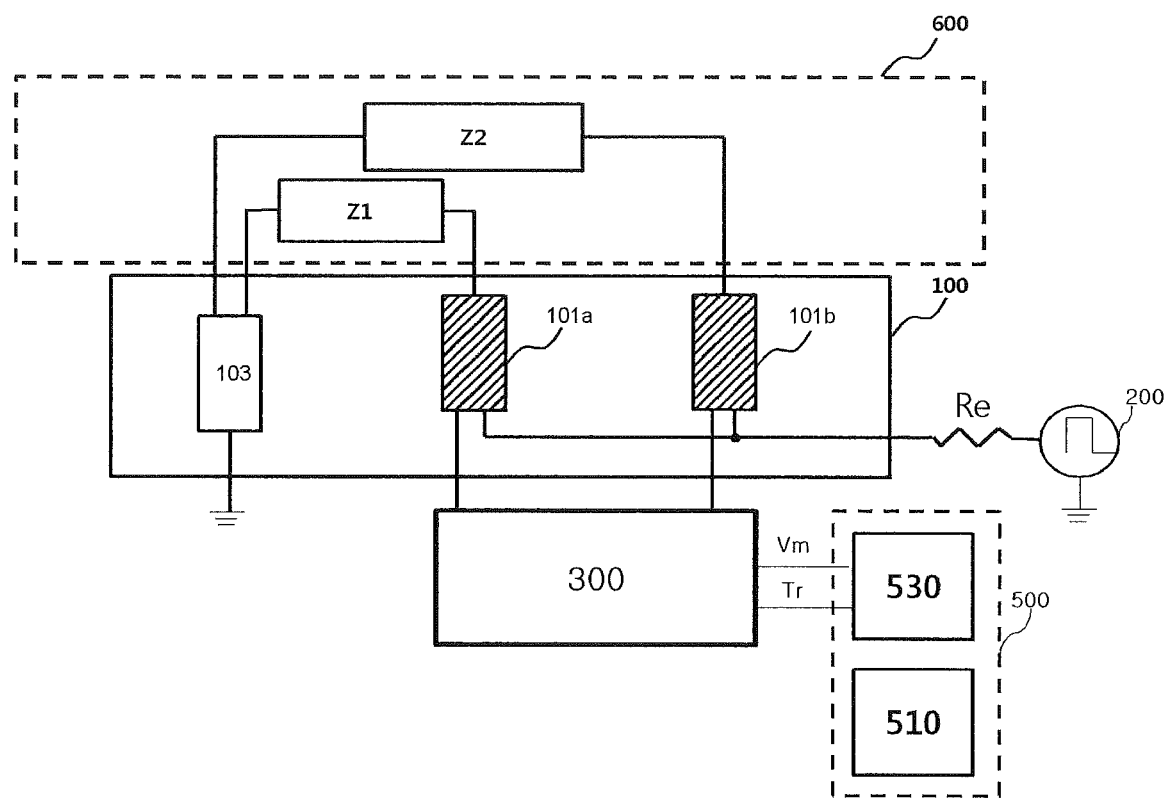
FIG. 6 is an equivalent circuit diagram illustrating a case in which a finger is placed on a panel unit of the biometric authentication apparatus shown in FIG. 5.

FIG. 6 is an equivalent circuit diagram illustrating a case in which a finger is placed on the panel unit of the biometric authentication apparatus shown in FIG. 5. The finger is designated by the reference numeral 600. The square wave input voltage with a single frequency is applied to each of the first electrodes 101a and 101b by the driving unit 200, and the voltage applied to the first electrodes 101a and 101b increases in the different shapes due to impedance Z1 and Z2 generated by the human finger placed between each of the first electrodes 101a and 101b and the second electrode 103.

Figure 7:
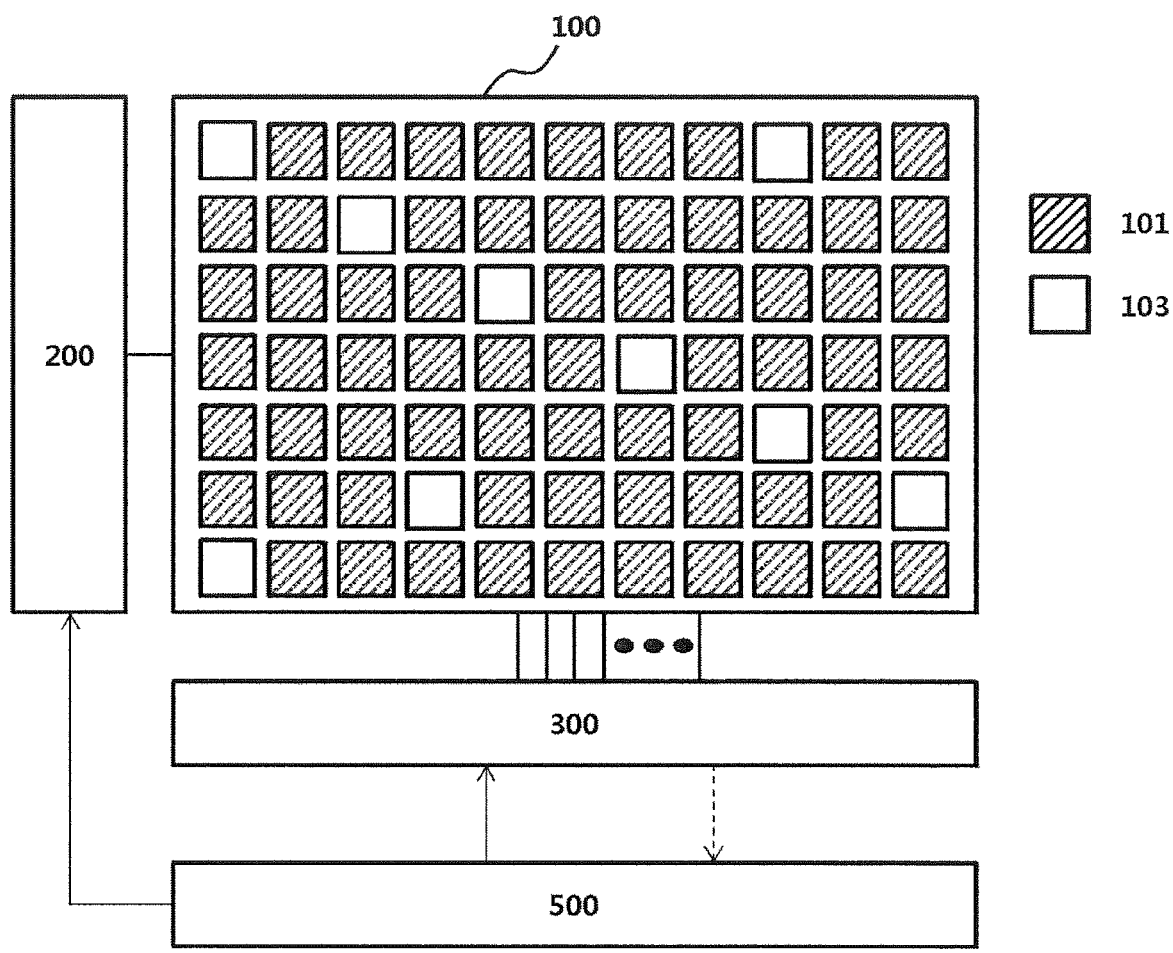
FIG. 7 is a configuration diagram illustrating a biometric authentication apparatus in which a panel unit includes a first electrode and a second electrode in a quadrangular shape according to an embodiment of the present invention.

The electrodes of the panel unit may be implemented in the various shapes, and it is unnecessary to implement the first electrode 101 and the second electrode 103 in the same number for matching. FIG. 7 is a configuration diagram illustrating a biometric authentication apparatus in which the panel unit 100 includes first electrodes 101 and second electrodes 103 in a quadrangular shape and the number of first electrodes 101 is larger than the number of second electrodes 103 according to an embodiment of the present invention.

Figure 8:
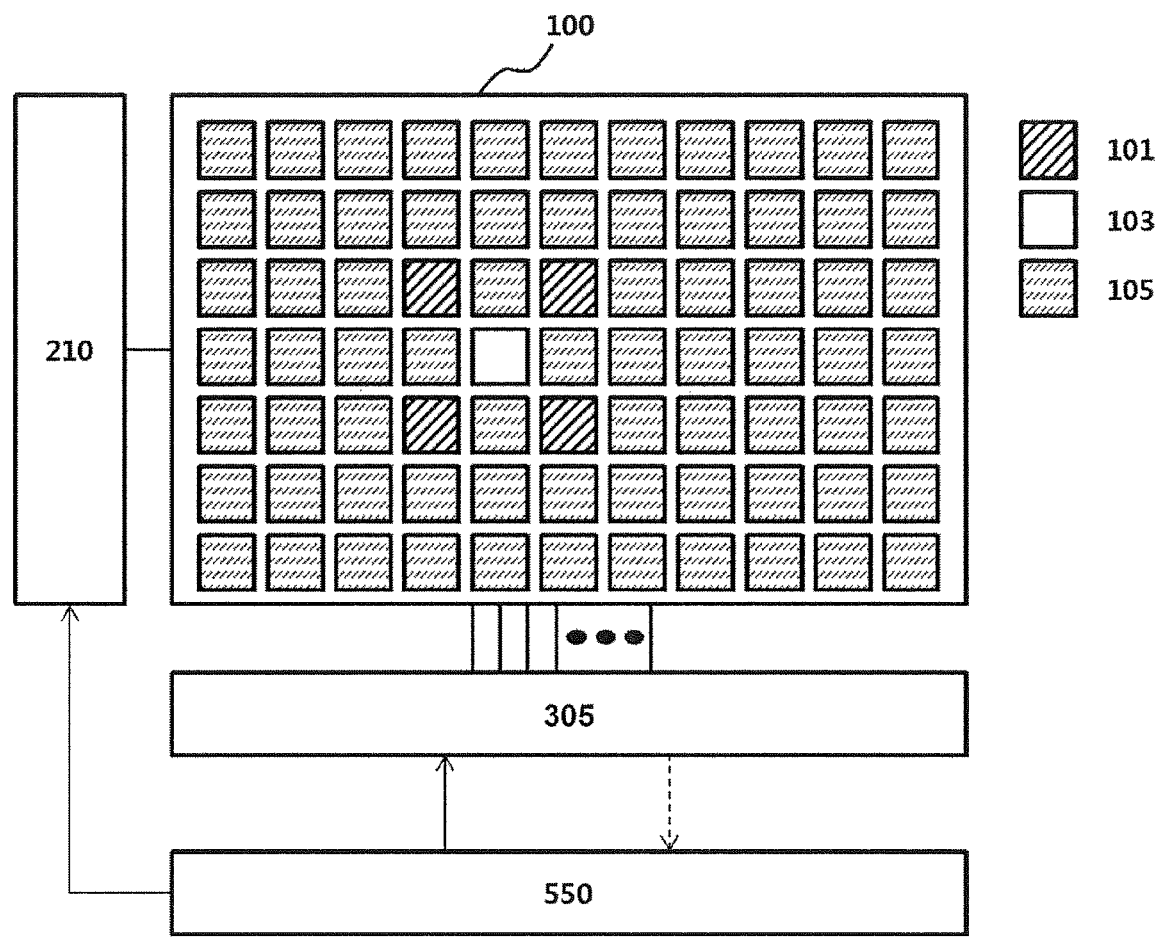
FIG. 8 is a configuration diagram illustrating a biometric authentication apparatus including a panel unit in which most of the electrodes consist of electrodes for fingerprint sensing and only some electrodes consist of electrodes for impedance sensing according to an embodiment of the present invention.

Also, it necessary, in constructing the panel unit, most of the electrodes may consist of capacitance electrodes (any electrodes capable of sensing the fingerprint in other methods) for conventional fingerprint sensing and only some regions may consist of electrodes for measuring impedance. FIG. 8 is a configuration diagram illustrating a biometric authentication apparatus including the panel unit in which most of the electrodes consist of electrodes for fingerprint sensing and only some electrodes consist of electrodes for impedance sensing according to an embodiment of the present invention. Shown is an example in which most regions of the panel unit 100 are provided with fingerprint sensing electrodes 105 for fingerprint sensing, and only some regions are provided with the first electrodes 101 and the second electrodes 103. In the case of FIG. 8, it is required that the driving unit 210 is modified by adding a function to the driving unit shown in FIG. 1 that a driving voltage in the form of the square wave with a single frequency (convertible to the period) of 500 Hz (preferably, 700 Hz) to 15,000 Hz is provided as well as a driving voltage for sensing the fingerprint is provided. Also, it is required that the sensing unit 305 is modified in such a manner as to measure the measurement voltage width and the arriving time as well as the physical, chemical, or electrical output value for fingerprint recognition.

As described above, in order to measure information on impedance to authenticate whether it is the human body, it is necessary that the driving unit 200 applies the waveform with the period of about 0.067 ms or more (corresponding to the frequency equal to or less than 15,000 Hz). In order to be used in fingerprint sensing, it is necessary that a high frequency wave of several to several tens MHz is applied. Accordingly, when performing biometric authentication as well as fingerprint authentication, the control and signal processing unit 550 is required to be modified in such a manner as to receive the output value from the sensing unit 305 and perform various processes for biometric authentication using the measurement voltage width and the arriving time as well as perform fingerprint authentication using the fingerprint characteristic value.

Figure 9:
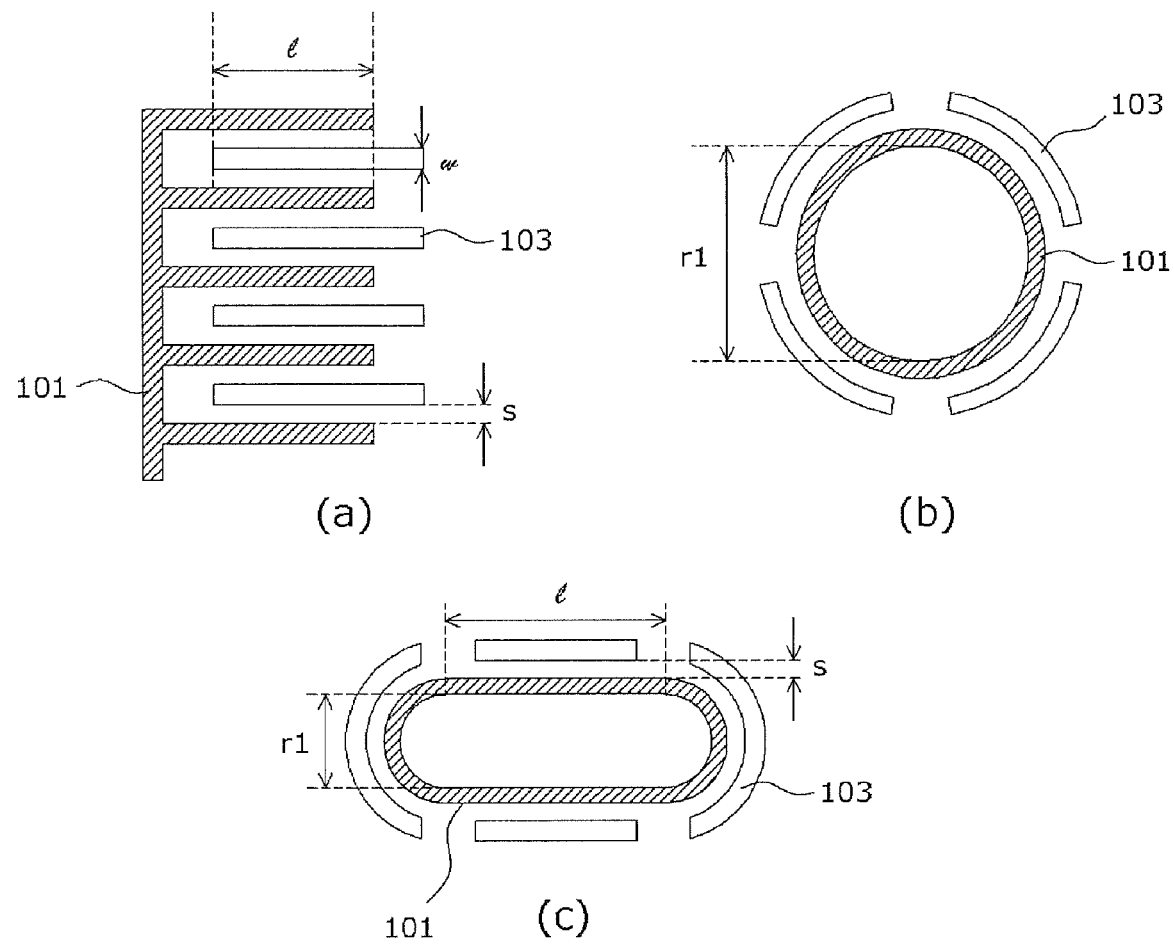
FIG. 9 is a plan view illustrating electrode shapes used in experiments according to the present invention.

The inventor of the present invention measured information on impedance formed by the human body fingerprint and the counterfeit fingerprint using various shapes of electrodes. The experiments were conducted with three shapes of electrodes as shown in FIG. 9. FIG. 9a, FIG. 9b and FIG. 9c are plan views illustrating electrode shapes used in experiments according to the present invention. FIG. 9a shows that the first electrode and the second electrode are implemented in the shape of interleaved electrodes. FIG. 9b shows that the first electrode and the second electrode are implemented in the shape of electrodes with a home button in a circular shape. FIG. 9c shows that the first electrode and the second electrode are implemented in the shape of electrodes with a home button in an oval shape.

In the electrodes shown in FIG. 9a, the experiment was conducted wherein the length l of an overlap between the first electrode and the second electrode was formed to be fixed to 1.5 mm and the width w of the electrode and the space s, between the first electrode 101 and the second electrode 103, were arbitrarily varied. In the electrodes shown in FIG. 9b, the experiment was conducted wherein r1 was formed to be fixed to 1.1 mm, the width w of the electrode was formed to be fixed to 0.5 mm, and the space s between the first electrode 101 and the second electrode 103 was arbitrarily varied. In the electrodes shown in FIG. 9c, the experiment was conducted wherein r1 was formed to be fixed to 0.5 cm, the longer length l of the oval first electrode was formed to be fixed to 1 cm, the width w of the electrode was formed to be fixed to 0.5 mm, and the space s between the first electrode 101 and the second electrode 103 was arbitrarily varied. As the results of the various experiments, in the various modified electrode structures shown in FIGS. 9a, 9b, and 9c, it was found that the arriving time and the measurement voltage width (note that in some experiments, the minimum measurement voltage value is mapped to "zero", and thus the maximum measurement voltage value is expressed in the measurement voltage width) measured with respect to the human body fingerprint and the counterfeit fingerprint showed similar patterns regardless of electrode structures. That is, it was found that the present invention applied to biometric authentication regardless of the shape of the electrode. However, since the results of the experiments are not a main feature of the present invention, the results of the experiments are not provided.

Since impedance has the phase and the magnitude, in order to accurately measure impedance, it is necessary to measure the phase and the magnitude of impedance response with respect to all frequencies. Conventionally, various circuits for measuring impedance phase and magnitude have been proposed. For example, as shown in FIG. 3 of non-patent document 1, a peak detector is used to measure the impedance magnitude, and input sinusoidal waves are multiplied by output sinusoidal waves and then a low pass filter is used to measure the impedance phase. However, it has been difficult to commercialize a known circuit implemented in a small-sized device, such as a smart phone, due to the circuit volume and a complicated measurement method. The inventor of the present invention found that in biometric authentication, the impedance phase is linearly proportional to the arriving time of the response voltage within a predetermined wavelength range and the impedance magnitude is a value associated with the measurement voltage width of the response voltage. Therefore, proposed are a method and apparatus for performing biometric authentication by measuring the measurement voltage width and the arriving time instead of measuring the impedance phase and magnitude.

By approximating the human body equivalent circuit shown in FIG. 1, when mathematically interpreting the simplified circuit in which the register Rr and the capacitor Cr are configured in series between input square waves and both terminals of the capacitor Cr are used as output terminals, the magnitude and the phase with respect to the human body model are obtained using Equation 1 and Equation 2, respectively.

$$|Z| = \frac{\sqrt{R_r^2 + (\omega R_r^2 C_r)^2}}{1 + (\omega R_r C_r)^2}$$ [Equation 1]

Here, |Z| is impedance magnitude $$\phi = \arctan(-\omega R_r C_r) = -\arctan(\omega R_r C_r)$$ [Equation 2]

Here, $\phi$ is impedance phase

As represented in Equation 2, the impedance phase $\phi$ to is proportional to the frequency. With a relation of $\omega=2\pi f$, the phase $\phi$ is obtained by obtaining and then putting the time constant into Equation 2.

Also, it was found that within a fixed period (corresponding to frequency 100 Hz to 10,000 Hz), a phase value calculated from the arriving time using Equation 2 after applying square waves to the circuit shown in FIG. 1 was similar to a phase value measured by a precise phase measurement device (LabView) after applying to sinusoidal waves the circuit shown in FIG. 1 with respect to the fingerprint formed of clay and the human body fingerprint

TABLE 1

| Fingerprint classification | Frequency | Minimum measurement voltage value (v) | Maximum measurement voltage value (v) | Arriving time (sec) | Calculated phase (degree) | Measured phase (degree) |
|---|---|---|---|---|---|---|
| Real | 100 | 0 | 4.8 | 0.000015 | −0.539984 | −0.55 |
| Real | 200 | 0 | 4.2 | 0.00003 | −2.1589776 | −1.441 |
| Real | 500 | 0 | 4.2 | 0.000028 | −5.0270606 | −3.166 |
| Real | 800 | 0 | 4.3 | 0.0000275 | −7.8701266 | −4.444 |
| Real | 1000 | 0 | 3.88 | 0.0000285 | −10.152396 | −5.025 |
| Real | 2000 | 0 | 3.72 | 0.0000275 | −19.06388 | −8.901 |
| Real | 5000 | 0 | 3.98 | 0.00002 | −32.141908 | −17.638 |
| Real | 8000 | 0 | 3.48 | 0.0000185 | −42.920104 | −22.563 |
| Real | 10000 | 0 | 2.88 | 0.0000165 | −46.033027 | −23.33 |
| Clay | 100 | 0 | 0.4 | 0.00125 | −38.146026 | −41.509 |
| Clay | 200 | 0 | 0.125 | 0.0008 | −45.151707 | −46.88 |
| Clay | 500 | 0 | 0.104 | 0.000425 | −53.168095 | −50.53 |
| Clay | 800 | 0 | 0.116 | 0.00027 | −53.616156 | −52.256 |
| Clay | 1000 | 0 | 0.102 | 0.00022 | −54.116836 | −52.366 |
| Clay | 2000 | 0 | 0.068 | 0.00012 | −56.449827 | −53.54 |
| Clay | 5000 | 0 | 0.0384 | 0.000045 | −54.726119 | −52.326 |
| Clay | 8000 | 0 | 0.03 | 0.0000282 | −54.798025 | −48.222 |
| Clay | 10000 | 0 | 0.0268 | 0.0000225 | −54.726119 | −44.659 |

In Table 1, the fingerprint classification is that the human body fingerprint (real) is distinguished from the counterfeit fingerprint (clay) formed of clay. The frequency indicates the frequency of the applied square wave or sinusoidal wave. The minimum measurement voltage value and the maximum measurement voltage value respectively indicate the minimum value and the maximum value of the voltage measured at the first electrode after applying the square wave of the corresponding frequency to the additional register Re while the human body fingerprint or the counterfeit fingerprint is placed on the equivalent circuit shown in FIG. 1. The arriving time indicates the measurement time taken to reach 63% of the measurement voltage width from the minimum measurement voltage value. The calculated phase indicates a phase in degrees calculated by putting the arriving time into Equation 2. The measured phase indicates a phase in degrees measured by applying sinusoidal wave of the corresponding frequency to an impedance measurement circuit and using LabView.

Accordingly, the measured phase represents an accurate value according to a normal impedance measurement circuit, and the calculated phase represents a phase obtained briefly by applying the square wave proposed in the present invention. As shown in Table 1, the calculated phase is substantially similar to the measured phase. The minimum measurement voltage value and the maximum measurement voltage value may have various values depending on charging/discharging. Table 1 shows maximum measurement voltage values calculated assuming that minimum measurement voltage values are zero in order to easily derive the measurement voltage width. In Table 1, the calculated phase is a value in degrees after converted from the value in radians obtained by calculating "arctan(2×π×frequency× arriving time)" considering the arriving time as the time constant τ. The phase is obtained using the time constant (τ=RC) as shown in Equation 2. However, since the arriving time is not equal to the time constant, it is not obtaining the exact phase.

Despite this error, Table 1 shows that phases calculated through measurement of the arriving time differ with respect to the human body fingerprint and the counterfeit fingerprint, so that use as an approximate phase value is possible in distinguishing the human body fingerprint and the counterfeit fingerprint.

The inventor of the present invention found that it is possible to distinguish the human body fingerprint from the counterfeit fingerprint by applying the square wave with a single period to the biometric authentication apparatus shown in FIG. 1 according to the present invention and measuring the measurement voltage width and the arriving time Tr at the first electrode. However, as described above, it is noted that in most experiments since the minimum measurement voltage value is mapped to "zero", the measurement voltage width is expressed as the maximum measurement voltage value. An authentication process using the biometric authentication apparatus shown in FIG. 1 proposed in the present invention will be described, briefly.

The driving unit 200 applies the square wave with a period T1 and a duty ratio of 50% to the additional register Re at a first step. Other values may be used as the period or the duty ratio. During several periods, square waves are applied from the driving unit 200 to the first electrode 101 through the additional register Re, and after stabilization, the square waves are measured by the sensing unit 300 to obtain the minimum value (the minimum measurement voltage value Vmin) and the maximum value (the maximum measurement voltage value Vm) at a second step. From the values obtained at the second step, the difference (Vm−Vmin) between the maximum measurement voltage value and the minimum measurement voltage value is obtained at a third step. By the square wave to be applied in the subsequent period, the time (the arriving time) that it takes the voltage measured at the first electrode 101 to reach 0.63×(Vm−Vmin) from Vmin is measured at a fourth step. Whether the two pieces of data measured using the maximum measurement voltage value and the arriving time are in a range of data measured in the human body is determined, and whether it is the human body is determined at a fifth step. In practice, after the first step, the second step is performed after the measurement voltage is stabilized, rather than the second step is immediately performed.

Here, a stabilized state means a state in which the maximum measurement voltage value and the minimum measurement voltage value, which are detected at the first electrode by the square wave applied to the first electrode, remain constant during two or more successive periods. In practical measurement, before measuring the maximum measurement voltage value and the minimum measurement voltage value at the step second step, a step for stabilizing the circuit is required. Initially, a voltage value charged in the capacitor (the capacitor of the finger equivalent model) which is generated by the square waves continuously applied and the finger varies only between the predetermined minimum value and the maximum value, which is referred to as a transient step. The finger is placed between the first electrode and the second electrode shown in FIG. 1, and the square waves with a fixed period are continuously applied. Before being stabilized (namely, in a transient state), a characteristic that the minimum value and the maximum value of the voltage measured at the first electrode gradually increase is found. After stabilization, the minimum value and the maximum value of the voltage measured at the first electrode remain constant.

In order to stabilize the circuit sufficiently, it is necessary to apply the square waves to the additional register Re during at least multiple periods. Before the circuit stabilization step, a phenomenon in which as the square wave is applied, the measurement voltage increases is shown. Also, in the case of the second step, after a square wave is applied during a single period, the measurement value is not accurate if measurement is performed only once. Thus, square waves are applied during multiple periods, and an average value of the minimum measurement voltage values and an average value of the maximum measurement voltage values measured for respective periods are used. For a similar reason, in the case of measuring the arriving time at the fourth step, square waves are applied during multiple periods, and an average value of the arriving times for respective periods is used.

Figure 10:
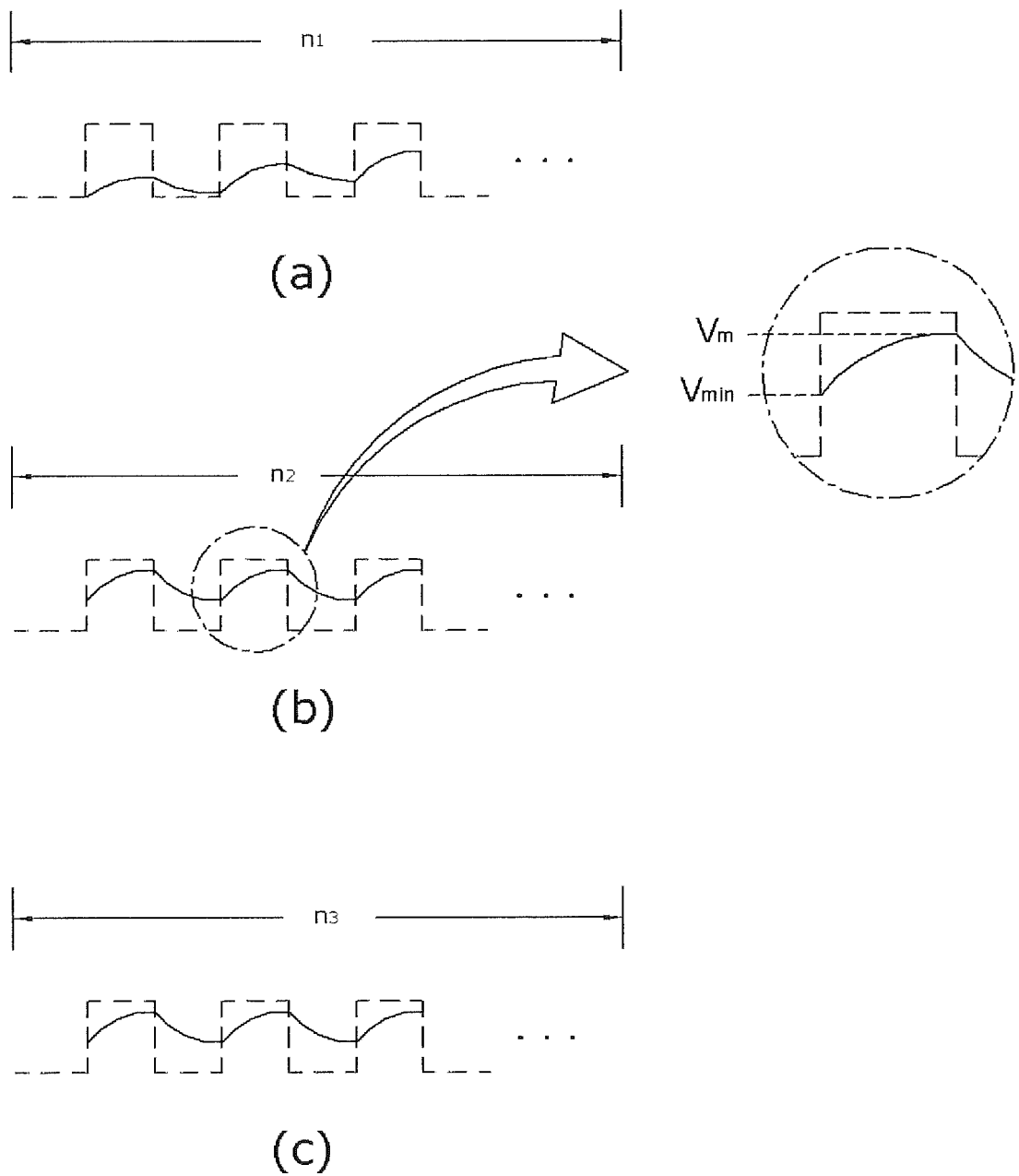
FIG. 10 is a diagram illustrating examples of square waves applied to an additional register Re in the circuit shown in FIG. 1.

FIG. 10 is a diagram illustrating examples of square waves applied to the additional register Re in the circuit shown in FIG. 1. In FIG. 10, (a) shows a transient state in which the circuit reaches to the stabilization step; (b) shows a step of measuring the minimum measurement voltage value and the maximum measurement voltage value; and (c) shows a step of measuring the arriving time, wherein the waveform expressed in a dotted line denotes the input square wave. A partial enlarged diagram illustrating the inside of the circle in (b) is shown. The waveform expressed in the dotted line denotes the input square wave, and the waveform expressed in the solid line denotes the output waveform. At the (a) step (the transient step), a square wave of the period n1 was applied, and at the step, the voltage of the output waveform gradually increased and ultimately reached the stabilization step. At the (b) step (the step of measuring the minimum measurement voltage value and the maximum measurement voltage value) and the (c) step (the step of measuring the arriving time), the square waves were applied during the periods of n2 and n3, respectively. At the (b) step and the (c) step, the output was stabilized while showing the same output characteristic every period. The partial enlarged diagram of (b) shows the minimum measurement voltage value Vmin and the maximum measurement voltage value Vm. That is, in the case of repeatedly applying the square waves of the same period, when a characteristic that a stabilized minimum value and maximum value is shown, these are defined as the minimum measurement voltage value Vmin and the maximum measurement voltage value Vm, respectively. In the experiments of Table 1, since the number of n1, n2, and n3 is equally set to 10 during 0.1 second and overall 30 square waves were applied during 0.1 second, the frequency of the applied square wave is 300 hz.

Figure 11:
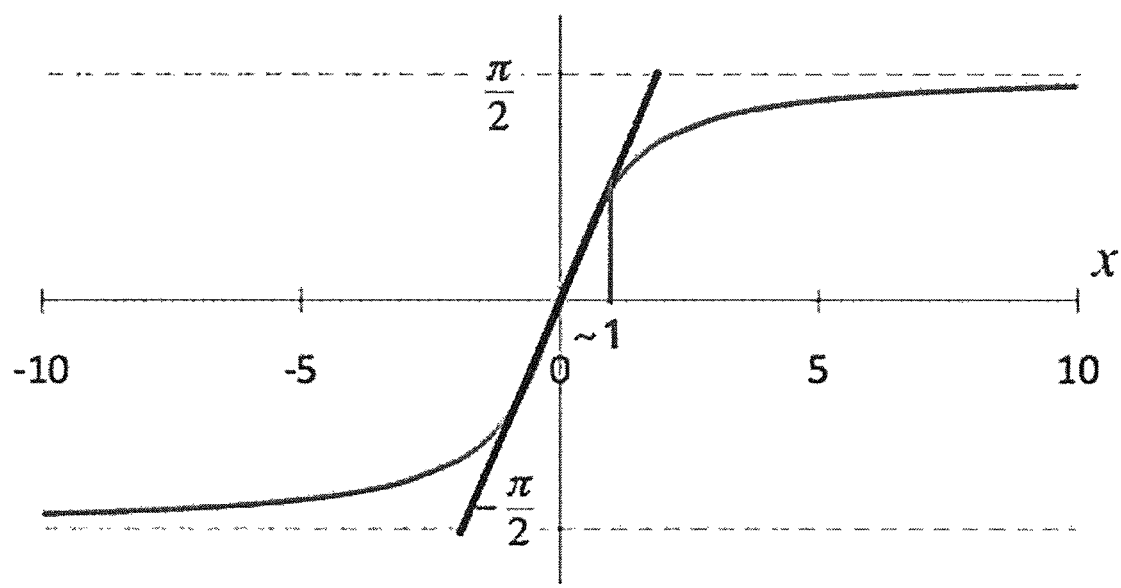
FIG. 11 is a graph illustrating $\tan^{-1}$ and the tangent line at the origin together.

FIG. 11 is a graph illustrating $\tan^{-1}$ and the tangent line at the origin together. As shown in FIG. 11, the graph linearly changes and is almost equal to the tangent line with respect to "0<=x<=1". Therefore, in the section of "0<=x<=1", $\tan^{-1}$ is linearly approximated using a one-dimensional function.

According to the experiments of the inventor of the present invention, in the experiments in Table 1, even though 30 square waves were applied during 0.1 second, somewhat stabilized results were able to be obtained. However, considering the unstable environment that might occur in practical use, applying at least 50 square waves during 0.1 second was able to obtain more accurate results. Here, 0.1 second means a preferred time for measuring the stabilized output voltage characteristics (the measurement voltage width and the arriving time) by the square wave of a single frequency without movement of the body while placing a particular portion of the human body firmly between the two electrodes shown in FIG. 1. Also, 50 square waves may be appropriately divided for use in steps (a), (b), and (c) shown in FIG. 10. For example, at the transient step (a) in FIG. 10, 20 square waves are applied; at the step (b) in FIG. 10, 15 square waves are applied; and the remaining square waves are used at the step (c) in FIG. 10. In this case, the frequency of the applied square wave is calculated as 500 Hz.

As shown in FIG. 11, the value of $\tan^{-1}$ linearly changes until a factor reaches "one". When it is larger than one, there is a difference between a phase value measured by a linearly approximating method described so far in the present invention and an actual phase value measured by an accurate experiment device, so that the theory and experiments described so far are not applicable. Referring to Equation 2, a relation shown in Equation 3 is derived.

$$1 = \omega R_r C_r = 2\pi f R_r C_r \quad \text{[Equation 3]}$$

A typical capacitance $C_r$ of the human body finger is 10 nF, and a typical resistance $R_r$ is 1 kΩ. By putting these to obtain the value of f, a value of about 15,000 Hz is obtained with "$f = 1/(2 \times 3.14 \times 1000 \times 10 \times 10^{-9})$". That is, in the present invention, as the frequency of the square wave, 500 Hz to 15,000 Hz may be used, which is converted into the period of 0.067 ms to 2.0 ms.

Figure 12A:
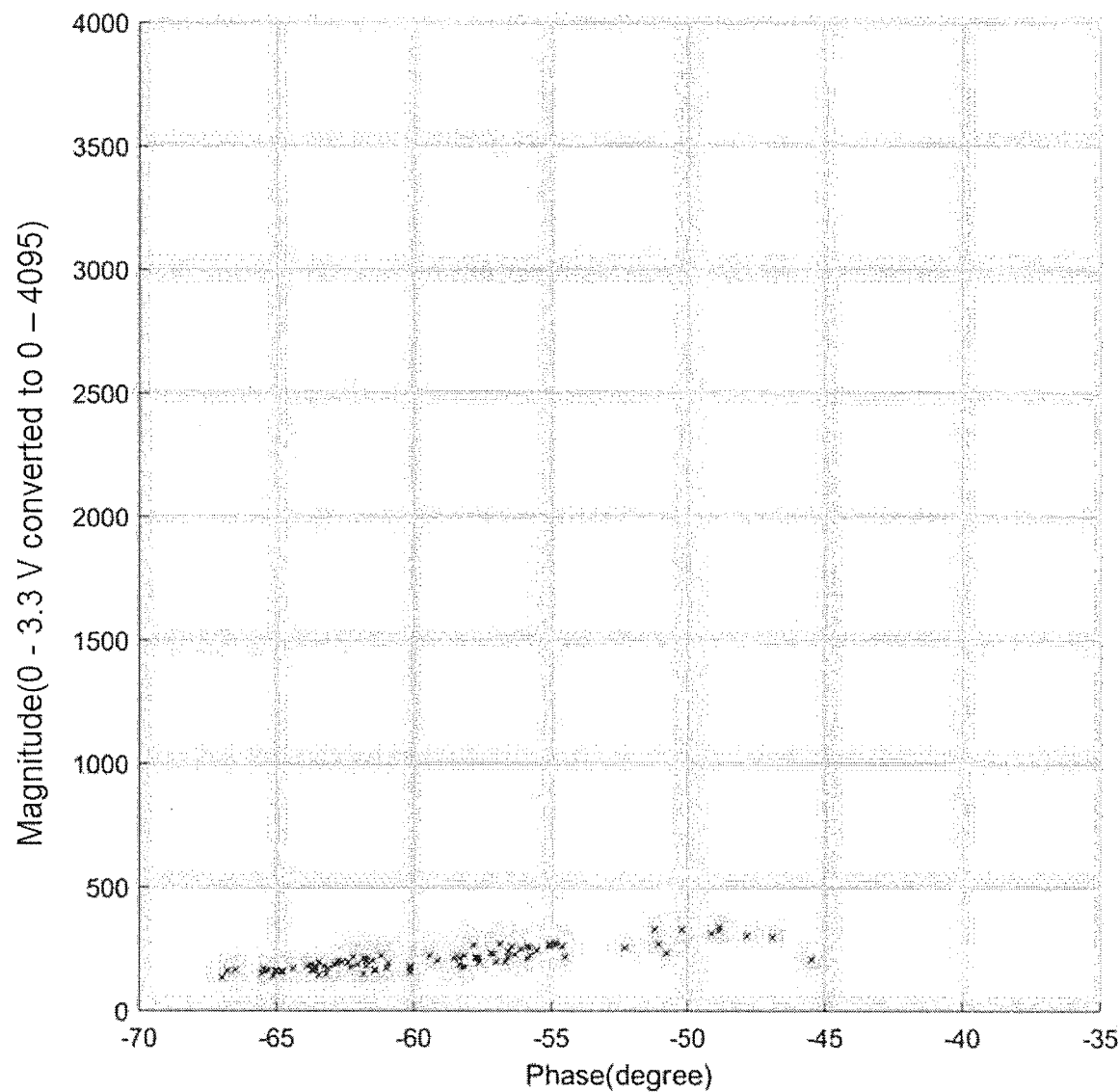
FIGS. 12A and 12B are graphs illustrating maximum measurement voltage values detected at a first electrode and phases over time when a square wave with a frequency of 1,000 Hz, a duty ratio of 50%, and the maximum voltage of 3.3 V is applied to the biometric authentication apparatus shown in FIG. 1.
Figure 13A:
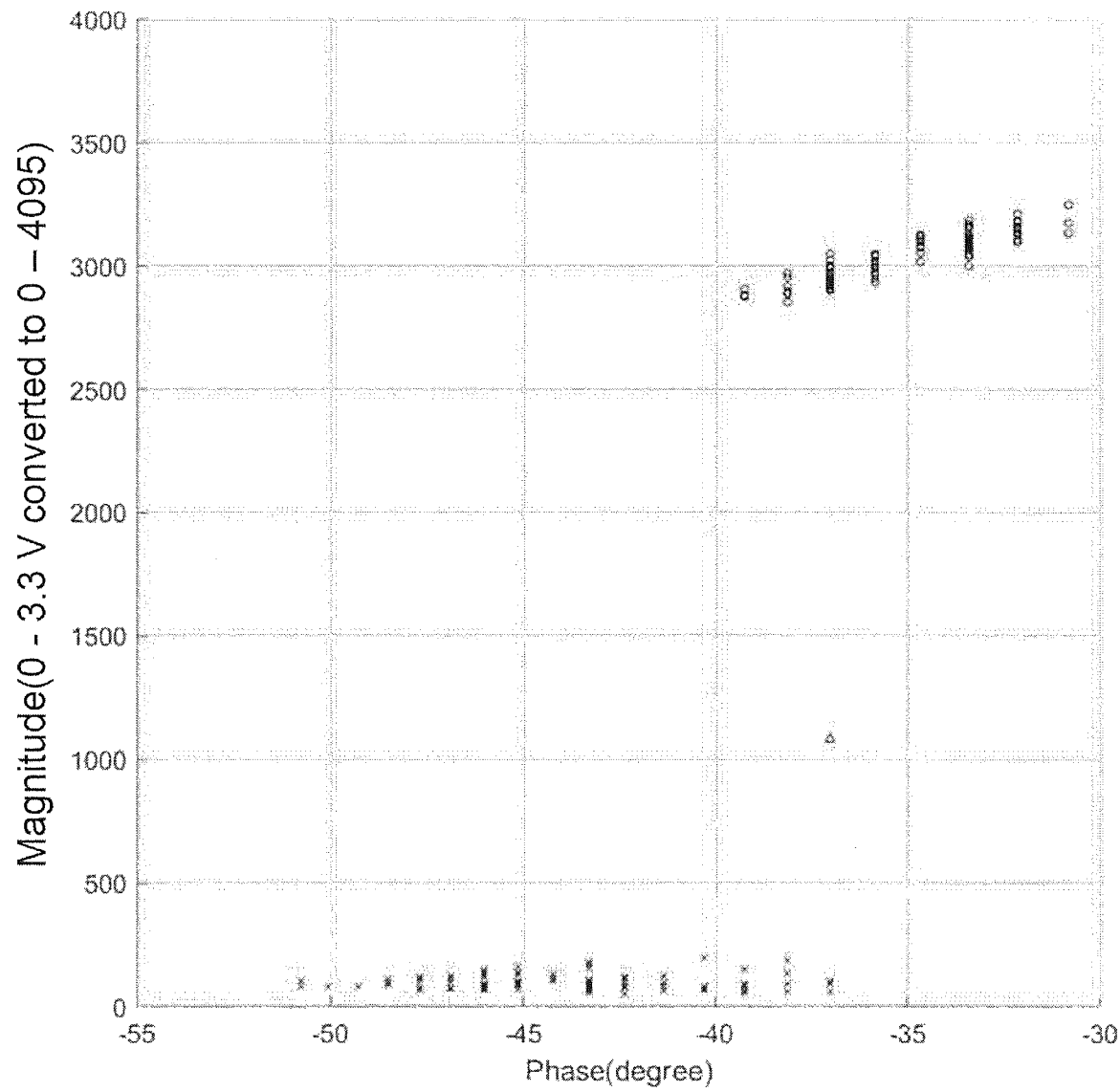
FIGS. 13A and 13B are graphs illustrating maximum measurement voltage values detected at a first electrode and phases over time when a square wave with a frequency of 5,000 Hz, a duty ratio of 50%, and the maximum voltage of 3.3 V is applied to the biometric authentication apparatus shown in FIG. 1.
Figure 13B:
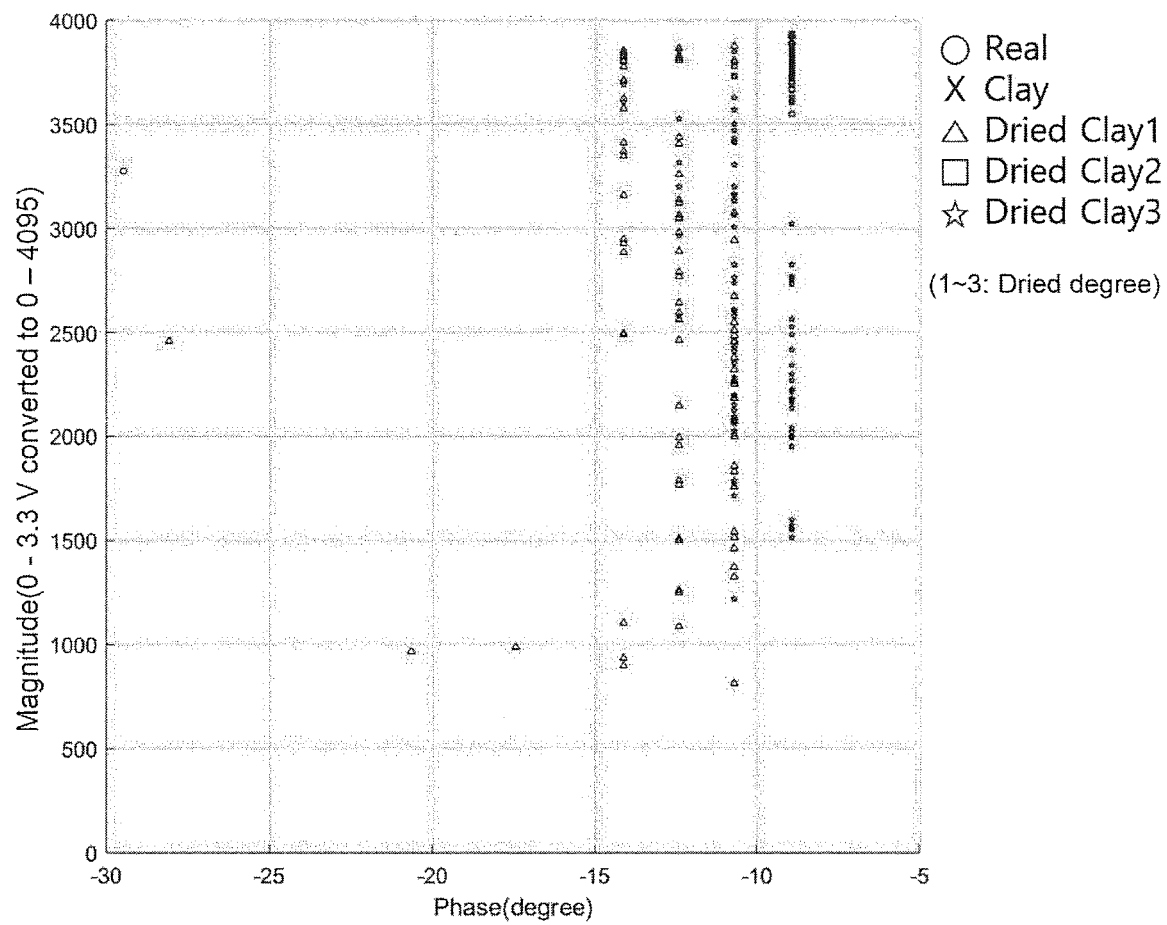
Figure 14A:
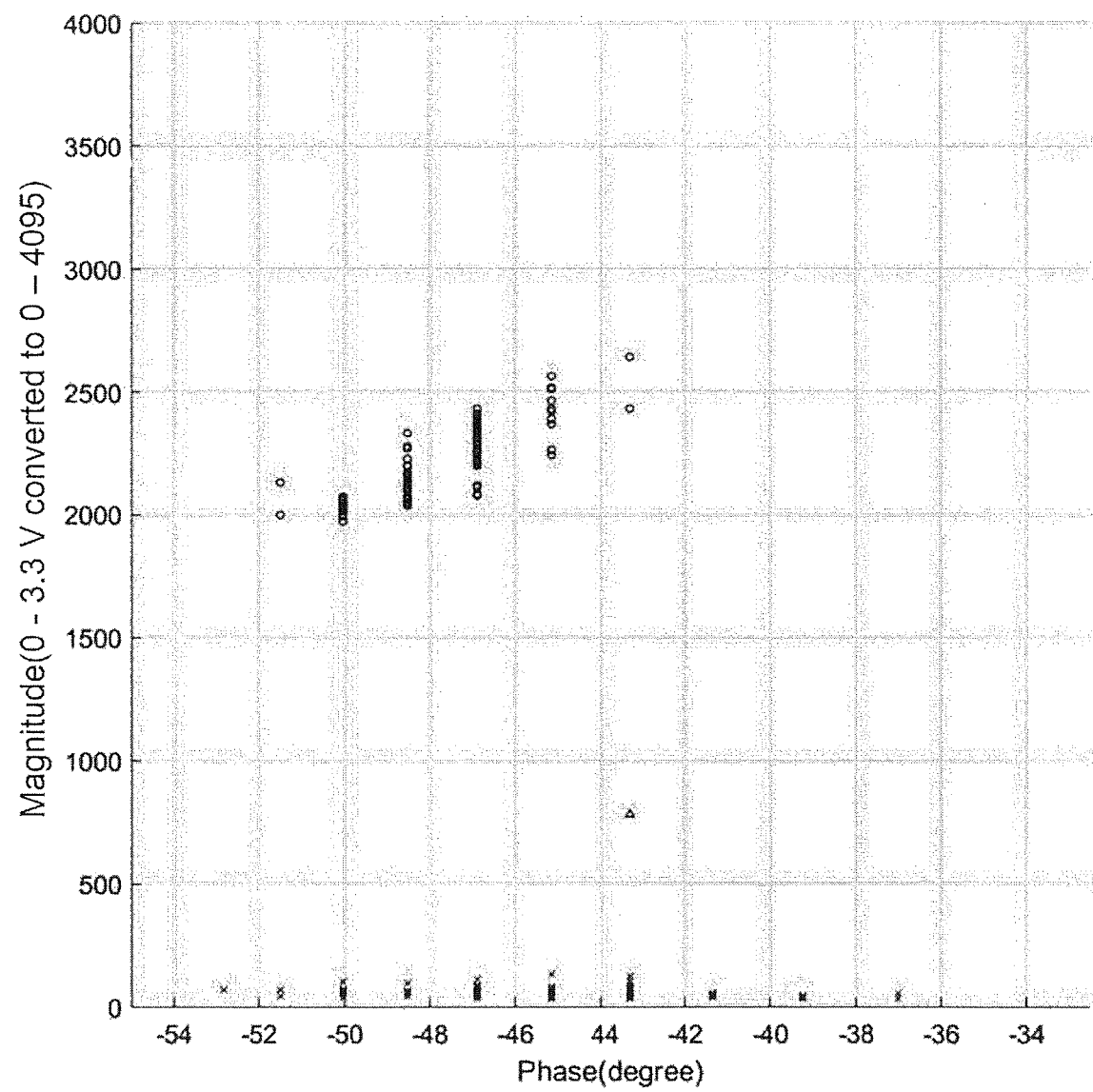
FIGS. 14A and 14B are graphs illustrating maximum measurement voltage values detected at a first electrode and phases over time when a square wave with a frequency of 10,000 Hz, a duty ratio of 50%, and the maximum voltage of 3.3 V is applied to the biometric authentication apparatus shown in FIG. 1.
Figure 14B:
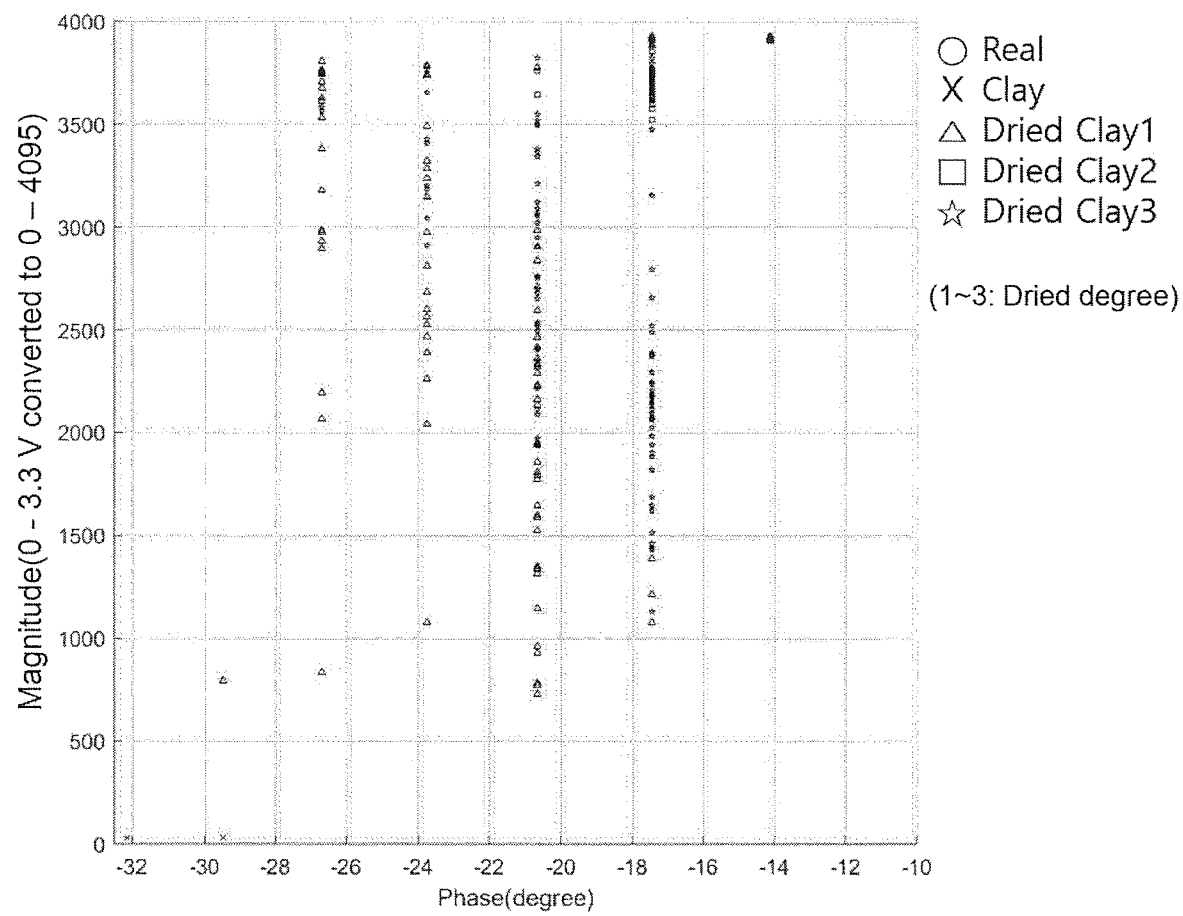

FIGS. 12A to 14B are graphs illustrating the maximum measurement voltage values detected at the first electrode and the calculated phase values when square waves with the duty ratio of 50%, the maximum voltage of 3.3 V, and different frequencies of 1,000 Hz (the period of 1 ms), 5,000 Hz (the period of 0.2 ms), and 10,000 Hz (the period of 0.1 ms) are applied to the biometric authentication apparatus shown in FIG. 1. FIGS. 12A and 12B show two graphs separately for enlargement. In FIG. 12A, phase values of −70° to −35° are expressed on the horizontal axis, and in FIG. 12B, phase values of −35° to 0° are expressed on the horizontal axis. In the present invention, as described above, a number of experiments were conducted with various frequencies to determine whether the counterfeit fingerprints formed of glue, gelatin, silicone, and clay have similar characteristics to the human body fingerprint. Among them, it was found that the counterfeit fingerprint formed of clay had the most similar characteristic to the human body fingerprint. Accordingly, in the experiments shown in FIGS. 12A to 14B, while the human body fingerprint and the counterfeit fingerprint formed of clay were placed between the first electrode 101 and the second electrode 103, the output voltages were measured. The measurement was performed 100 times for each material. The fingerprint formed of clay contains much moisture at the time of manufacture initially, but it changes into a hard dry state as moisture evaporates with time. Thus, its characteristic is that a resistance value and a capacitance value vary with time. In FIGS. 12A and 14B, the experiments were conducted by dividing the dry state of the clay fingerprint into four stages. In the graphs, clay designated by "X" denotes the counterfeit fingerprint in the initial state of being formed of clay containing the most moisture. "Dried Clay3" designated by "☆" denotes the clay fingerprint in the state of being dried for the longest time. That is, "Clay, Dried Clay1, Dried Clay2, and Dried Clay3" are enumerated in order of being not dried. "Clay" is the counterfeit fingerprint in the state of being least dried, and "Dried Clay3" is the being dried for the longest time. Also, in the graphs shown in FIGS. 12A to 14B, the horizontal axis represents the phase, and the vertical axis represents (maximum measurement voltage value−minimum measurement voltage value) which is sensed at the first electrode. It is noted that the vertical axis represents (maximum measurement voltage value−minimum measurement voltage value) converted into a number of "0 to 4,095" using a 12-bit analog-digital converter (ADC) for easy checking with the naked eye. Also, in the graphs as shown in FIGS. 12A to 16, it is noted that since the minimum measurement voltage value is mapped to a value of zero, the maximum measurement voltage value shown in the graphs is the same as the value of the measurement voltage width in the present invention.

Figure 12B:
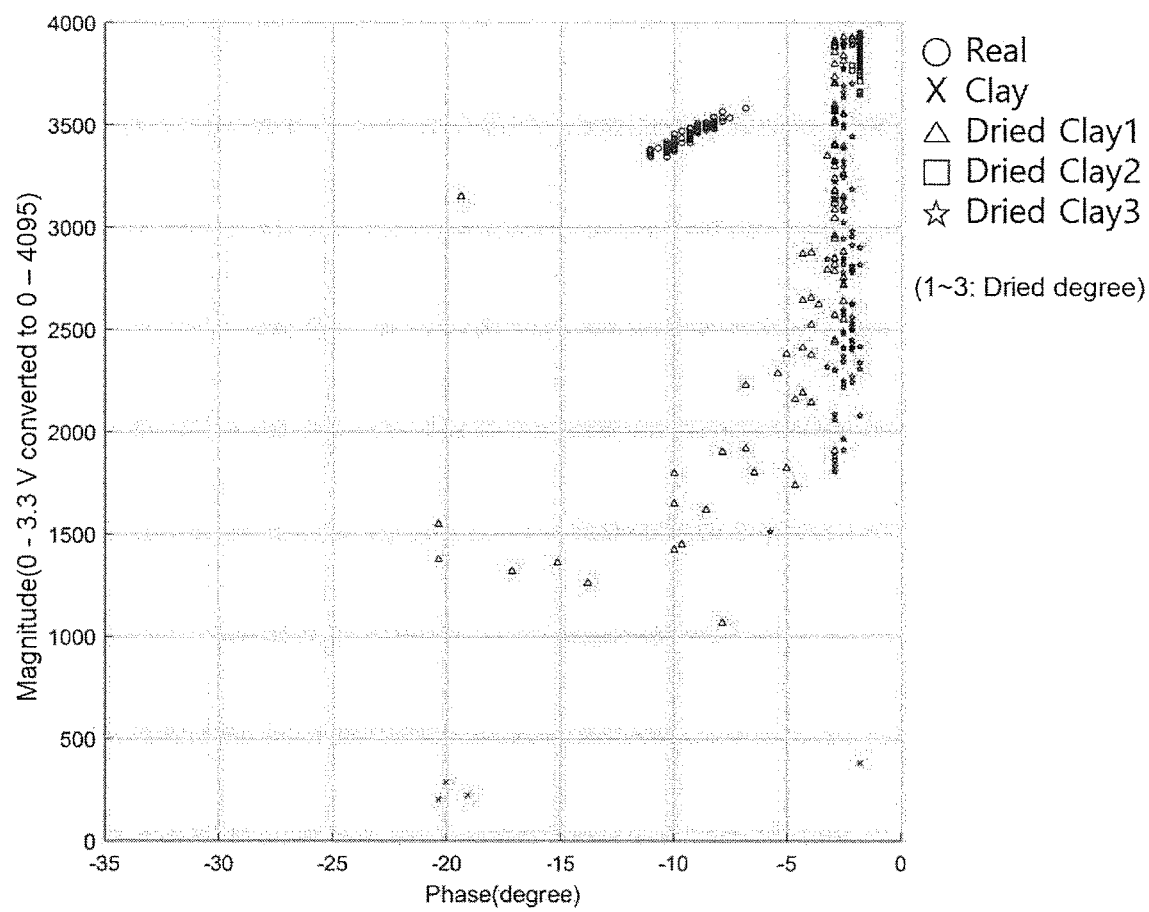

FIGS. 12A and 12B are graphs illustrating the maximum measurement voltage values detected at the first electrode and the phases over time when the square wave with the frequency of 1,000 Hz, the duty ratio of 50%, and the maximum voltage of 3.3 V is applied to the biometric authentication apparatus shown in FIG. 1. The human body fingerprint designated by "○" has the phase values of −7° to −11° and the maximum measurement voltage values of 3,300 to 3,600 (the actual voltage values of 2.66 V to 2.90 V), and thus the human body fingerprint is distinguished from the counterfeit fingerprints. For example, "Clay" designated by "x" has the phase values of −68° to −3° widely distributed and the maximum measurement voltage values of about 100 to 350. Accordingly, by comparing only the maximum measurement voltage values, the counterfeit fingerprint formed of "Clay" is distinguished from the human body fingerprint "Dried Clay1" designated by "s" has the phase values of −21° to −3° and the maximum measurement voltage values of 1,100 to 3,900 distributed, so that at first glance it may seem that it is indistinguishable from the human body fingerprint. However, in the case of "Dried Clay1" having the values of −7° to −11°, the maximum measurement voltage values are equal to or less than 2,000, so that it is clearly distinguished from the human body fingerprint "Dried Clay2" designated by "○" and "Dried Clay3" designated by "☆" have the phase values of −3° or more, so that they are distinguished from the human body fingerprint by comparing only the phase values.

FIGS. 13A and 13B are graphs illustrating the maximum measurement voltage values detected at the first electrode and the phases over time when the square wave with a frequency of 5,000 Hz, a duty ratio of 50%, and the maximum voltage of 3.3 V is applied to the biometric authentication apparatus shown in FIG. 1. FIGS. 13A and 13B show two graphs separately for enlargement. In FIG. 13A, phase values of −70° to −35° are expressed on the horizontal axis, and in FIG. FIG. 13B, phase values of −35° to 0° are expressed on the horizontal axis. The human body fingerprint designated by "○" has the phase values of −39° to −31° and the maximum measurement voltage values of 2,800 to 3,300 (the actual voltage values of 2.26 V to 2.66 V), and thus the human body fingerprint is distinguished from the counterfeit fingerprints. For example, "Clay" designated by "x" has the maximum measurement voltage values of about 100 to 250. Accordingly, by comparing only the maximum measurement voltage values, the counterfeit fingerprint formed of "Clay" is distinguished from the human body fingerprint. "Dried Clay1" designated by "Δ" has the phase values of −37° to −11° and the maximum measurement voltage values of 800 to 3,800 distributed, so that at first glance it may seem that it is indistinguishable from the human body fingerprint. However, in the case of "Dried Clay1" having the values of −39° to −31°, the maximum measurement voltage values are equal to or less than 2,500, so that it is clearly distinguished from the human body fingerprint "Dried Clay2" designated by "○" and "Dried Clay3" designated by "☆" have the phase values of −14° or more, so that they are distinguished from the human body fingerprint by comparing only the phase values.

FIGS. 14A and 14B are graphs illustrating the maximum measurement voltage values detected at the first electrode and the phases over time when the square wave with a frequency of 10,000 Hz, a duty ratio of 50%, and the maximum voltage of 3.3 V is applied to the biometric authentication apparatus shown in FIG. 1. FIGS. 14A and 14B show two graphs separately for enlargement. In FIG. 14A, phase values of −70° to −35° are expressed on the horizontal axis, and in FIG. 14B, phase values of −35° to 0° are expressed on the horizontal axis. The human body fingerprint designated by "○" has the phase values of −52° to −42° and the maximum measurement voltage values of 1,900 to 2,700 (the actual voltage values of 1.53 V to 2.18 V), and thus the human body fingerprint is distinguished from the counterfeit fingerprints. For example, "Clay" designated by "x" has the maximum measurement voltage values of about 100 to 200. Accordingly, by comparing only the maximum measurement voltage values, the counterfeit fingerprint formed of "Clay" is distinguished from the human body fingerprint. "Dried Clay1" designated by "Δ" has the phase values of −43° to −17° and the maximum measurement voltage values of 700 to 3,800 distributed, so that at first glance it may seem that it is indistinguishable from the human body fingerprint. However, in the case of "Dried Clay1" having the values of −52° to −42°, the maximum measurement voltage values are equal to or less than 800, so that it is clearly distinguished from the human body fingerprint "Dried Clay2" designated by "□" and "Dried Clay3" designated by "☆" have the phase values of −27° or more, so that they are distinguished from the human body fingerprint by comparing only the phase values.

Figure 15:
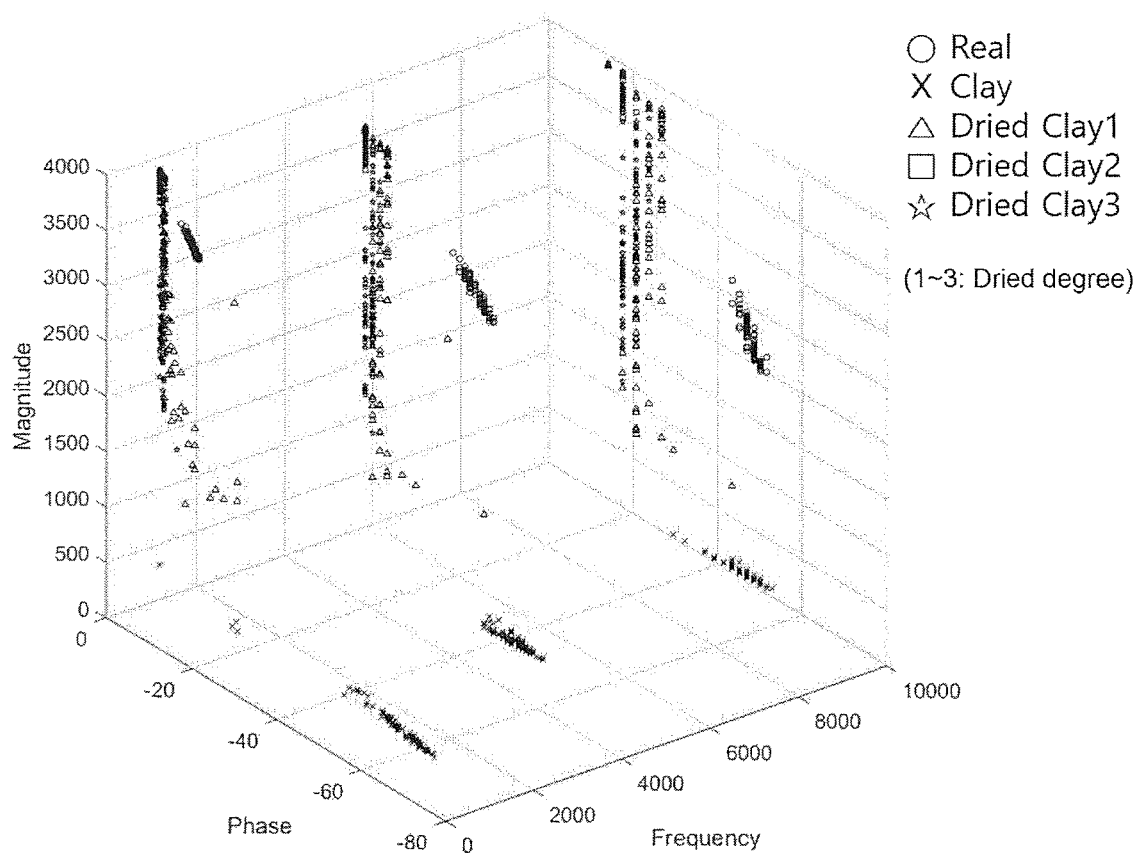
FIG. 15 is a three-dimensional graph illustrating experiment results in FIGS. 12A, 12B, 13A, 13B, 14A, and 14B at once.

FIG. 15 is a three-dimensional graph illustrating experiment results in FIGS. 12A, 12B, 13A, 13B, 14A, and 14B at once. With respect to any frequency, the human body fingerprint designated by "○" is distinguished from the counterfeit fingerprints by using the phase values and the maximum measurement voltage values. The x-axis represents the phase of 0° to −80° in units of 20°, the y-axis represents the frequency of 0 Hz to 10,000 Hz in units of 2,000 Hz, and the z-axis represents the maximum measurement voltage value of 0 to 4,000 (the actual voltage of 0 V to 3.22 V) in units of 500. Also, in FIGS. 12A to 15, the phase value is shown instead of the arriving time Tr. In the actual experiments, rather than the phase value is measured, the arriving time Tr is measured and converted into a phase. Accordingly, the graphs in FIGS. 12A to 15 show that the human body fingerprint is possibly distinguished from the counterfeit fingerprints when only the arriving time Tr and the measurement voltage width are known.

As described above, since the counterfeit fingerprint formed of clay vary in moisture content over time after being formed, the capacitance value and the resistance value vary with time. More specifically, the counterfeit fingerprint formed of clay has a characteristic that the capacitance decreases and the resistance increases over time. In FIGS. 12A to 14B, the experiments were conducted by dividing the dry state of the fingerprint formed of clay into four stages. The inventor of the present invention came up with the idea that the clay counterfeit fingerprint in a dry state which is not proposed in the experiments might be measured as the same point as the human body on the graphs.

Figure 16:
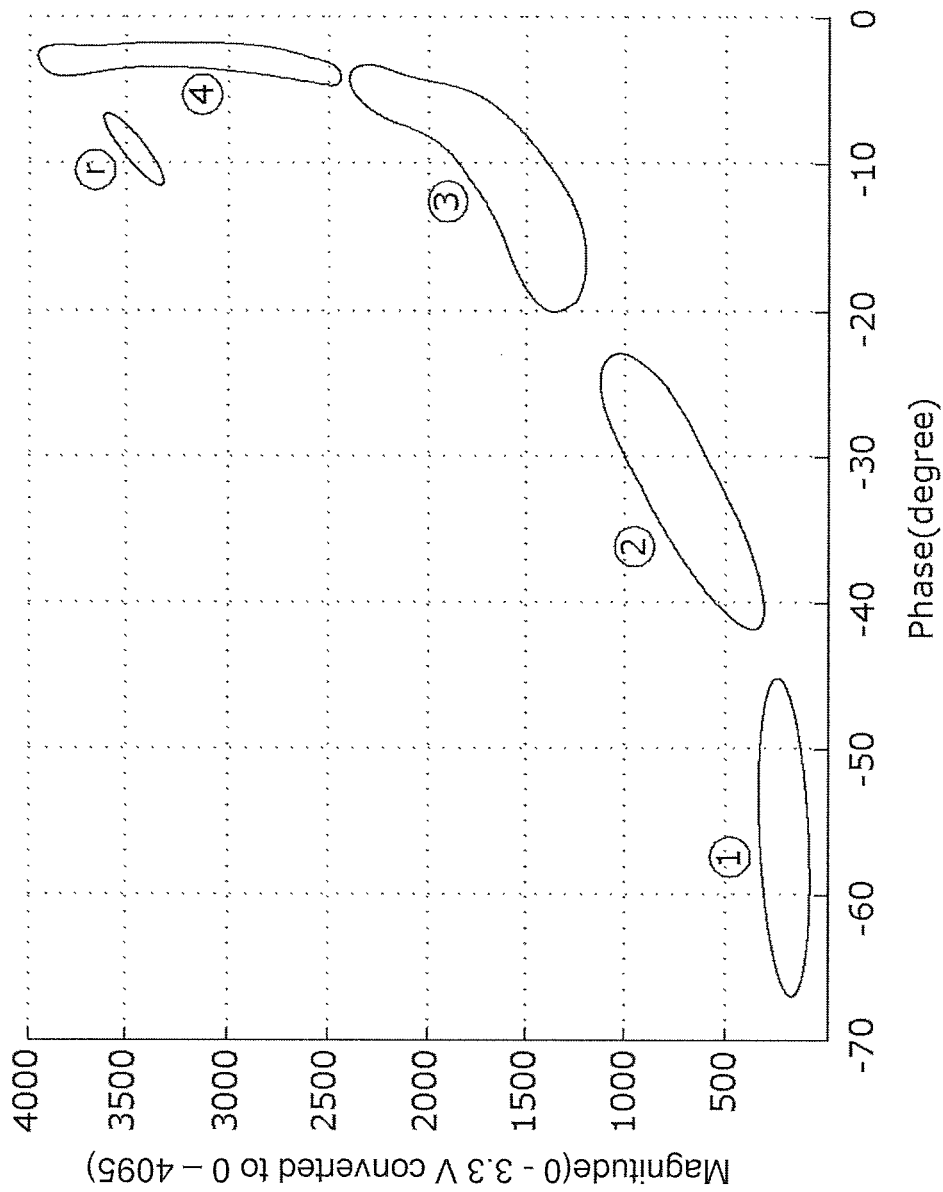
FIG. 16 is a graph illustrating the states shown in FIGS. 12A and 12B in a grouping manner.

Whether or not this case possibly occurs will be inferred with reference to FIG. 16. FIG. 16 is a graph illustrating the states shown in FIGS. 12A and 12B in a grouping manner. The measurement data of the human body fingerprint is located at ⓡ, and ①, ②, ③, and ④ indicate regions at which data of the clay counterfeit fingerprint is located according to the dry state. That is, the clay counterfeit fingerprint is dried over time in order of ①→②→③→④ and has the measurement data position varying on the graph with a characteristic that the capacitance value decreases and the resistance value increases. As shown in FIG. 16, in the case of the clay counterfeit fingerprint, data position varies in order of ①→②→③→④ according to the dried degree, but located only in the region which is clearly distinguished from the region ⓡ in which the data of the human body fingerprint is located. With reference to FIG. 16, inferred is that even through the dry state varies, the clay counterfeit fingerprint does not have the maximum measurement voltage value (in this case, the measurement voltage width) and the arriving time in the same range as the human body fingerprint.

Figure 17:
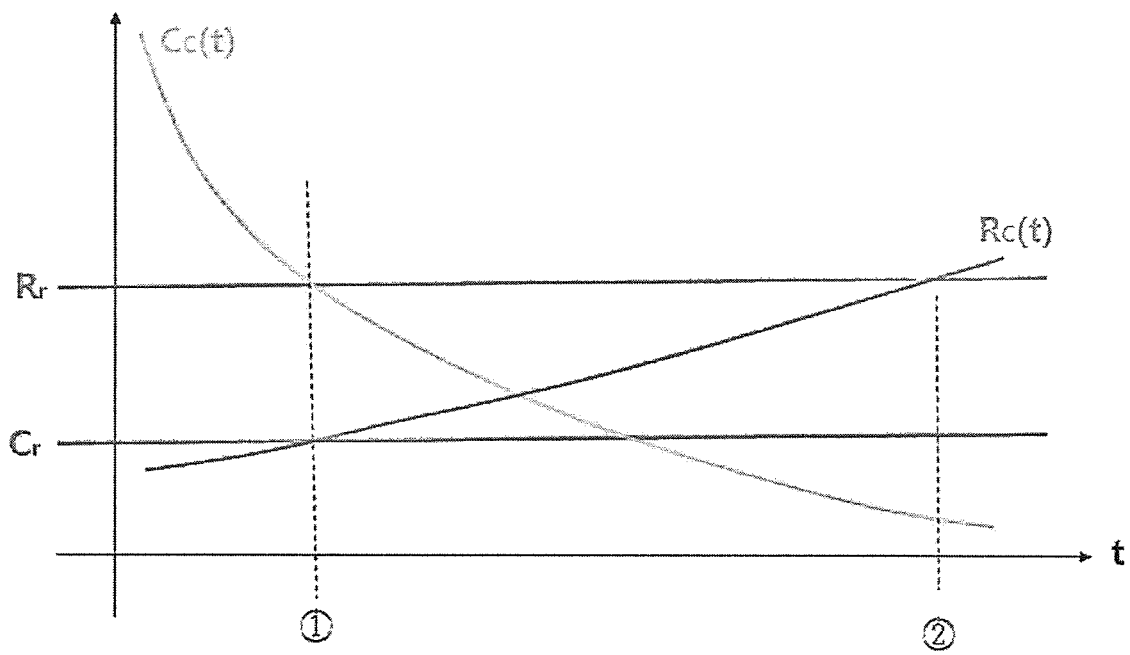
FIG. 17 is a graph illustrating change over time in a resistance value and a capacitance value measured in a human body fingerprint and a resistance value and a capacitance value measured in a clay fingerprint.

Change in a characteristic of the clay fingerprint with time will be described in detail. FIG. 17 is a graph illustrating change over time in a resistance value and a capacitance value measured in the human body fingerprint and a resistance value and a capacitance value measured in the clay fingerprint. For convenience, the resistance value and the capacitance value measured in the human body fingerprint are regarded as unchanging constants, and they are substantially constant in the same human body, and thus it is a valid hypothesis. Cr denotes the capacitance value measured in the human body, Rr denotes the resistance value measured in the human body, Cc(t) denotes the capacitance value varying with time measured in the clay counterfeit fingerprint, and Rc(t) denotes the resistance value varying with time measured in the clay counterfeit fingerprint. In FIG. 17, the vertical axis represents that a relative change of the resistance value Rr measured in the human body fingerprint and the resistance value Rc(t) measured in the clay fingerprint and a relative change of the capacitance value Cr measured in the human body fingerprint and the capacitance value Cc(t) measured in the clay fingerprint.

According to Equation 2, the phase satisfies the relation of −arctan(2πfRc(t)Cc(t)), and thus a case such as Equation 4 occurs. That is, at a particular frequency (or phase), the case that the product of the capacitance and the resistance in the human body fingerprint is equal to the product of the capacitance and the resistance, which vary with time, in the clay counterfeit fingerprint occurs.

$$C_r \times R_r = C_c(t) \times R_c(t) \quad \text{[Equation 4]}$$

In the graph shown in FIG. 12B, this phenomenon occurred at the phase of −10°. As shown in FIG. 17, at the section where the phase remains the same (the point ① in FIG. 17), the relation in Equation 5 is satisfied. That is, the measurement voltage widths satisfy the relation in Equation 6 and are distinguishable from each other. Referring to FIG. 1, the measurement voltage width is in a state in which there is almost no voltage increase after the voltage is applied and a particular time has passed, namely, the capacitor Cr is sufficiently charged. In this case, Cr is an open circuit where current does not flow. Therefore, the voltage at the reference numeral "101" in FIG. 1 is distributed with Rr/(Re+Rr). Therefore, when the equivalent circuit resistance is small, the measurement voltage width is small. This phenomenon is found in the graphs shown in FIGS. 12A to 14B.

$$R_c(t) < R_r \quad \text{[Equation 5]}$$

measurement voltage width of clay counterfeit fingerprint<measurement voltage width of human body fingerprint [Equation 6]

As shown in FIG. 17, at a particular time, a point (the point ②) in which the resistance value Rc(t) measured in the clay fingerprint is equal to the resistance value Rr measured in the human body fingerprint occurs. Therefore, the point in which the maximum measurement voltage value measured in the clay fingerprint is equal to the measurement voltage width measured in the human body fingerprint occurs. This is the case in which the measurement voltage width shown in the graph in FIG. 12B is in a range of 3,300 to 3,600 (the actual voltage value of 2.66 V to 2.90 V). However, in this case, as shown in FIG. 17, the relation in Equation 7 is satisfied, and thus the phases satisfy Equation 8 in the relevant section and are distinguishable from each other. This phenomenon is found in the graphs in FIGS. 12A to 14B.

$$C_c(t) < C_r \quad \text{[Equation 7]}$$

phase of clay counterfeit fingerprint<phase of human body fingerprint [Equation 8]

In describing the embodiments of the present invention, the detailed descriptions of known related constitutions or functions thereof may be omitted if they make the gist of the present invention unclear.

It is understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of example embodiments of the present invention. As used herein, the term "and/or," includes any and all combinations of one or more of the associated listed items.

It is understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

The terms used herein are for the purpose of describing particular embodiments only and is not intended to be limiting. As used herein, the singular forms are intended to include the plural forms as well, unless the context clearly indicates otherwise. It is understood that the terms "comprise", "include", etc. when used herein, specify the presence of stated features, integers, steps, operations, elements, components, or combinations of them but do not preclude the presence or addition of one or more other features, integers, steps, operations, elements, components, or combinations thereof.

Also, constituents described in the embodiments of the present invention are independently shown so as to represent characteristic functions different from each other. Thus, it does not mean that each constituent is constituted in a constitutional unit of separated hardware or software. That is, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is to divided are also included in the scope of the present invention, if not departing from the essence of the present invention.

Unless otherwise defined, all terms including technical and scientific terms used herein have the same meaning as commonly understood by one of ordinary skill in the art to which the present invention belongs. It is further understood that terms, such as those defined in commonly used dictionaries, should be interpreted as having a meaning that is consistent with their meaning in the context of this specification and the relevant art, and is not be interpreted in an idealized or overly formal sense unless expressly so defined herein.

The invention claimed is:

1. A biometric authentication apparatus for authenticating a human body using impedance of a particular part of the human body, apparatus comprising:
   a first electrode;
   a second electrode spaced apart from the first electrode by maintaining an electrical insulation state therebetween;
   a driving unit applying a square wave with a single period to the first electrode;
   a sensing unit detecting a maximum measurement voltage value and a minimum measurement voltage value that are a maximum value and a minimum value of voltage detected at the first electrode while the voltage measured at the first electrode is in a stabilized state, the sensing unit outputting an arriving time that is the time required for the detected voltage to reach a particular range of a measurement voltage width, which is a difference between the maximum measurement voltage value and the minimum measurement voltage value, from the minimum measurement voltage value; and
   a signal processing unit determining the human body using the measurement voltage width and the arriving time input from the sensing unit.

2. The apparatus of claim 1, wherein the stabilized state means a state where the maximum measurement voltage value and the minimum measurement voltage value, which are detected at the first electrode by the square wave applied to the first electrode, remain constant during two or more successive periods.

3. The apparatus of claim 2, further comprising:
   an additional resistor Re of which one end is connected to the driving unit and the other end is connected to the first electrode.

4. The apparatus of claim 1, wherein the second electrode is connected to ground.

5. The apparatus of claim 4, wherein a period of the square wave is set to a value in which the voltage measured at the first electrode before reaches a saturation state.

6. The apparatus of claim 4, wherein the single period is one period selected from periods ranging from 0.067 ms to 2.00 ms.

7. The apparatus of claim 6, wherein the single period is one period selected from periods ranging from 0.067 ms to 1.42 ms.

8. The apparatus of claim 1, wherein the sensing unit comprises:

an AD conversion unit converting an analog voltage input from the first electrode into a digital voltage;

a maximum and minimum voltage detection unit detecting the minimum measurement voltage value and the maximum measurement voltage value by using the voltage input from the AD conversion unit during one or more periods; and an arriving time calculation unit calculating the arriving time Tr by using the voltage varying with time input from the AD conversion unit and the minimum measurement voltage value and the maximum measurement voltage value that are input from the maximum and minimum voltage detection unit.

9. A biometric authentication method of determining whether an object placed on a first electrode and a second electrode is a human body by using a biometric authentication apparatus including the first electrode and the second electrode, wherein operation of the apparatus comprising:

a first step of applying a square wave with a single period to the first electrode;

a second step of obtaining a maximum measurement voltage value and a minimum measurement voltage value that are a maximum value and a minimum value of voltage detected at the first electrode while the voltage measured at the first electrode is in a stabilized state;

a third step of measuring an arriving time that is the time required for the detected voltage to reach a particular range of a measurement voltage width, which is a difference between the maximum measurement voltage value and the minimum measurement voltage value, from the minimum measurement voltage value; and a fourth step of authenticating whether the object is the human body by using the measurement voltage width, which is a difference between the maximum measurement voltage value and the minimum measurement voltage value, and the arriving time.

10. The method of claim 9, wherein the stabilized state means a state where the maximum measurement voltage value and the minimum measurement voltage value, which are detected at the first electrode by the square wave applied to the first electrode, remain constant during two or more successive periods.

11. The method of claim 9, wherein at the first step, the square wave with the single period is applied to the first electrode through an additional resistor Re.

12. The method of claim 11, wherein the second electrode is connected to ground.

13. The method of claim 12, wherein a period of the square wave is set to a value in which the voltage measured at the first electrode before reaches a saturation state.

14. The method of claim 9, wherein the single period is one period selected from periods ranging from 0.067 ms to 2.00 ms.

15. The method of claim 14, wherein the single period is one period selected from periods ranging from 0.067 ms to 1.42 ms.

* * * * *